US012784661B2

(12) United States Patent
Lo et al.

(10) Patent No.: US 12,784,661 B2
(45) Date of Patent: Nov. 3, 2026

(54) ELECTRONIC DEVICE

(71) Applicant: InnoLux Corporation, Miao-Li County (TW)

(72) Inventors: Min-Hsin Lo, Miao-Li County (TW); Ming-Chun Tseng, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 19/204,641

(22) Filed: May 12, 2025

(65) Prior Publication Data

US 2025/0384822 A1 Dec. 18, 2025

Related U.S. Application Data

(60) Provisional application No. 63/658,883, filed on Jun. 12, 2024.

(30) Foreign Application Priority Data

Nov. 11, 2024 (CN) ......................... 202411596092.4

(51) Int. Cl.
*G09G 3/32* (2016.01)

(52) U.S. Cl.
CPC ....... *G09G 3/32* (2013.01); *G09G 2310/0267* (2013.01); *G09G 2310/08* (2013.01); *G09G 2330/045* (2013.01)

(58) Field of Classification Search
CPC ............. G09G 3/32; G09G 2310/0267; G09G 2310/08; G09G 2330/045
See application file for complete search history.

(56) References Cited

U.S. PATENT DOCUMENTS 6,222,585 B1 * 4/2001 Endoh ........................ G01J 5/20 348/297
10,455,653 B1 10/2019 Watanabe
10,867,553 B2 12/2020 Tseng
10,986,725 B2 4/2021 Chang
11,145,241 B2 10/2021 Chen
11,164,509 B2 11/2021 Chang
11,501,701 B2 11/2022 Ting
(Continued)

FOREIGN PATENT DOCUMENTS

CN 107689217 A 2/2018

*Primary Examiner* — Andre L Matthews
(74) *Attorney, Agent, or Firm* — Winston Hsu

(57) ABSTRACT

An electronic device having an active region and a non-active region is provided and includes an electronic component, a first gate driving circuit, at least one first output control component and a first control circuit. The electronic component is disposed in the active region, and the first gate driving circuit, the first output control component and the first control circuit are disposed in the non-active region. The first gate driving circuit is coupled to the electronic component. The first output control component includes a control terminal, a first terminal and a second terminal, wherein the control terminal of the first output control component is coupled to the first control circuit, the first terminal of the first output control component is coupled to the first gate driving circuit, and the second terminal of the at least one first output control component is coupled to the electronic component.

18 Claims, 13 Drawing Sheets

(56) References Cited

U.S. PATENT DOCUMENTS

| | | | | |
|---|---|---|---|---|
| 11,974,479 | B2 | 4/2024 | Hu | |
| 2015/0325181 | A1* | 11/2015 | Wang | G09G 3/3677 377/64 |
| 2018/0040272 | A1 | 2/2018 | Lin | |
| 2018/0226042 | A1* | 8/2018 | Fletcher | B64D 43/00 |
| 2021/0183833 | A1 | 6/2021 | Hu | |
| 2021/0193790 | A1 | 6/2021 | Hu | |
| 2022/0328460 | A1 | 10/2022 | Fan | |
| 2023/0047265 | A1* | 2/2023 | Ooghe | G09G 3/3648 |
| 2024/0046882 | A1* | 2/2024 | Lee | G09G 3/3266 |
| 2025/0078719 | A1* | 3/2025 | Sawahata | G09G 3/2092 |

* cited by examiner

ELECTRONIC DEVICE

CROSS REFERENCE TO RELATED APPLICATION

This application claims the benefit of U.S. Provisional Application No. 63/658,883, filed on Jun. 12, 2024. The content of the application is incorporated herein by reference.

BACKGROUND OF THE DISCLOSURE

1. Field of the Disclosure

The present disclosure relates to an electronic device and particularly to an electronic device including an output control component coupled to a gate driving circuit.

2. Description of the Prior Art

With the development of display technology, more and more electronic devices are combined with displays to enhance their functions. In the conventional electronic device, a gate driving circuit is required to control on/off of the pixels in a display region, such that data signals may be input to the pixels in a corresponding time by a data driving circuit to display images. However, as long as an output unit of a certain stage in the gate driving circuit is damaged and provide an abnormal output signal, the images displayed in the whole display region will be abnormal, and even the electronic device may be overheated and burned out due to short circuit.

SUMMARY OF THE DISCLOSURE

It is an objective of the present disclosure to provide an electronic device to reduce occurrence of abnormal image or risk of overheating or burning out the electronic device due to short circuit.

The present disclosure provides an electronic device having an active region and a non-active region. The electronic device includes an electronic component, a first gate driving circuit, at least one first output control component and a first control circuit. The electronic component is disposed in the active region, and the first gate driving circuit, the first output control component and the first control circuit are disposed in the non-active region. The first gate driving circuit is coupled to the electronic component. The first output control component includes a control terminal, a first terminal and a second terminal, wherein the control terminal of the first output control component is coupled to the first control circuit, the first terminal of the first output control component is coupled to the first gate driving circuit, and the second terminal of the at least one first output control component is coupled to the electronic component.

In the electronic device of the present disclosure, the control circuit in the signal control circuit may turn on or off the output control components through the received enable signal, and/or the detecting circuit may provide the enable signal by determining if the n-th stage scan signal is normal to turn on or off the output control components. Accordingly, when at least one output unit of one of the gate driving circuits is abnormal, all the output control components corresponding to the abnormal gate driving circuit may be turned off to prevent the operation of the electronic component from being affected by the abnormal signal and causing abnormal effects, such as abnormal images displayed in the entire display region or overheating and burning of the electronic device due to short circuit.

These and other objectives of the present disclosure will no doubt become obvious to those of ordinary skill in the art after reading the following detailed description of the embodiment that is illustrated in the various figures and drawings.

DETAILED DESCRIPTION

Figure 1:
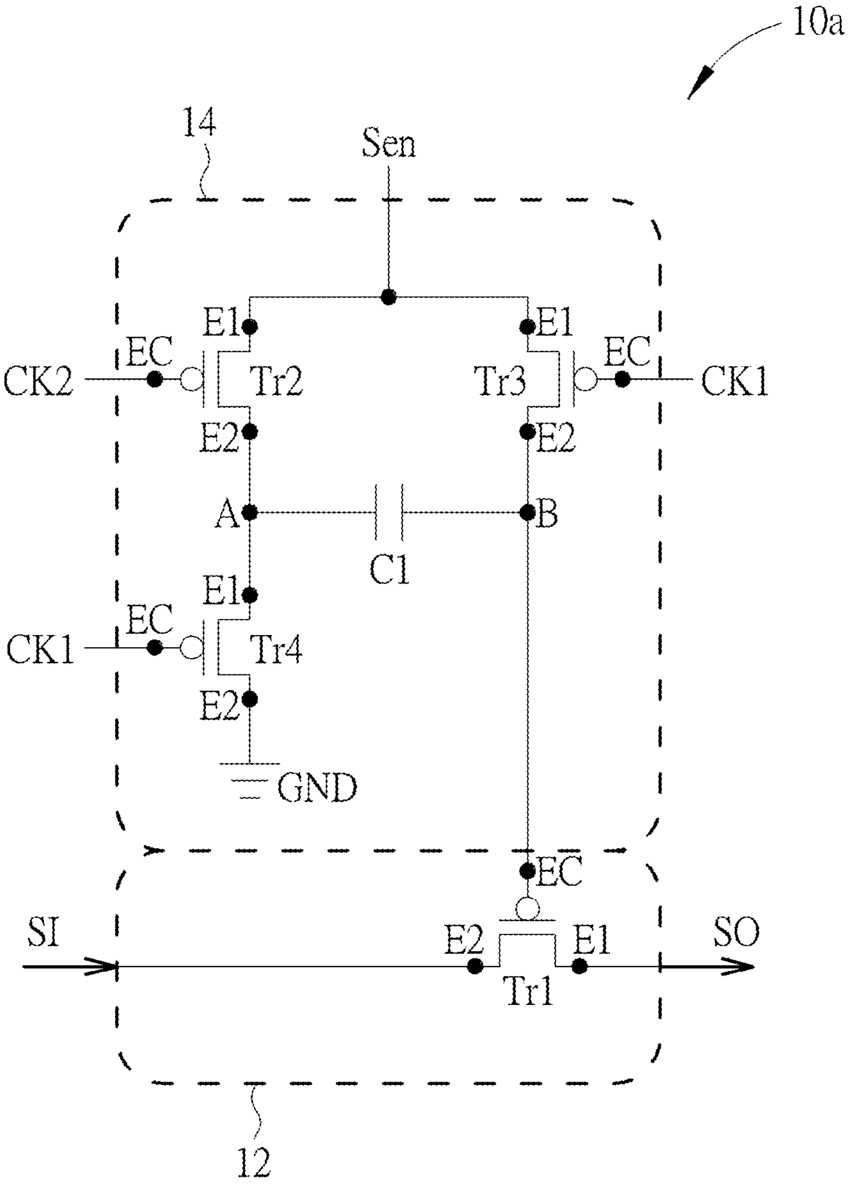
FIG. 1 schematically illustrates a signal control circuit according to a first embodiment of the present disclosure.

The contents of the present disclosure will be described in detail with reference to specific embodiments and drawings. It is noted that, for purposes of illustrative clarity and being easily understood by the readers, the following drawings may be simplified schematic diagrams, and components therein may not be drawn to scale. The numbers and sizes of the components in the drawings are just illustrative and are not intended to limit the scope of the present disclosure.

Certain terms are used throughout the specification and the appended claims of the present disclosure to refer to specific components. Those skilled in the art should understand that electronic equipment manufacturers may refer to a component by different names, and this document does not intend to distinguish between components that differ in name but not function. In the following specification and claims, the terms "comprise", "include" and "have" are open-ended fashion, so they should be interpreted as "including but not limited to . . . ".

The ordinal numbers used in the specification and the appended claims, such as "first", "second", etc., are used to describe the components of the claims. It does not mean that the component has any previous ordinal numbers, nor does it represent the order of a certain component and another component, or the sequence in a manufacturing method. These ordinal numbers are just used to make a claimed component with a certain name be clearly distinguishable from another claimed component with the same name.

In addition, when one component is "coupled to", "connected to" or "electrically connected to" another component, it may be understood that the component is directly connected to the another component to form an electrical connection, and alternatively, the component and the another component may be connected or electrically connected to each other by another component (indirectly). On the contrary, when the component is "directly coupled to", "directly connected to" or "directly electrically connected to" the another component, it may be understood that there is no intervening component or layer between the component and the another component to connect or electrically connect them. The term "connected" includes means of "directly contact" or "indirect contact". In addition, the term "electrically connected" or "coupled" may include any kind of direct or indirect electrical connection.

As disclosed herein, the terms "approximately", "essentially", "about", or "substantially" generally mean within 10%, 5%, 3%, 2%, 1%, or 0.5% of the reported numerical value or range. The quantity disclosed herein is an approximate quantity, that is, without a specific description of "approximately", "essentially", "about", or "substantially", the quantity may still include the meaning of "approximately", "essentially", "about", or "substantially".

The term "between a value A and a value B" is interpreted as including the value A and the value B or at least one of the value A or the value B, and including other values between the value A and value B.

It should be understood that according to the following embodiments, features of different embodiments may be replaced, recombined or mixed to constitute other embodiments without departing from the spirit of the present disclosure. The features of various embodiments may be mixed arbitrarily and used in different embodiments without departing from the spirit of the present disclosure or conflicting.

Unless otherwise defined, all terms (including technical and scientific terms) used herein have the same meaning as commonly understood by those skilled in the art. It should be understood that these terms, such as those defined in commonly used dictionaries, should be interpreted as having meaning consistent with the relevant technology and the background or context of the present disclosure, and should not be interpreted in an idealized or excessively formal way, unless there is a specific definition in the embodiments of the present disclosure.

An electronic device of the present disclosure may, for example, include a display device, a light emitting device, a sensing device, an antenna device, a touch device, a medical device, a tiled device, a package device or other suitable electronic devices, but not limited thereto. The electronic device may, for example, be a bendable, stretchable, foldable, rollable and/or flexible electronic device. The display device may, for example, be applied to a laptop, a public display, a tiled display, a car display, a touch display, a television, a monitor, a smartphone, a tablet, a light source module, an illumination equipment, a military equipment or an electronic device applied to the above-mentioned product, but not limited thereto. The sensing device may, for example, be a sensing device used for detecting variation in capacitances, light, heat, or ultrasound, but not limited thereto. The sensing device may, for example, include a biosensor, a touch sensor, a fingerprint sensor, other suitable sensors, or any combination of sensors mentioned above. The display device may, for example, include liquid crystal molecules, light emitting diodes, a fluorescent material, a phosphor material, other suitable display medium, or any combination of the above-mentioned display medium, but not limited thereto. The light emitting diode may, for example, include an organic light emitting diode (OLED), a mini light emitting diode (mini LED), a micro light emitting diode (micro LED), a quantum dot light emitting diode (e.g., QLED or QDLED), other suitable materials, or any combination of the above-mentioned material, but not limited thereto. The antenna device may, for example, be a liquid crystal antenna, a varactor diode antenna, or antennas of other types, but not limited thereto. The medical device may be a medical inspection device, but not limited thereto. The tiled device may, for example, include a tiled display device or a tiled antenna device, but not limited thereto. Furthermore, the appearance of the electronic device may be, for example, rectangular, circular, polygonal, a shape with curved edges, curved or other suitable shapes. The electronic device may have peripheral systems such as a driving system, a control system, a light source system, a shelf system, etc. The electronic device may include electronic units, in which the electronic units may include a passive component and an active component, and for example include a capacitor, a resistor, an inductor, a diode, a transistor, a sensor, etc. It is noted that the electronic device of the present disclosure may be any combination of the above-mentioned devices, but not limited thereto.

FIG. 1 schematically illustrates a signal control circuit according to a first embodiment of the present disclosure. As shown in FIG. 1, a signal control circuit 10*a* provided by the present embodiment may include at least one output control component 12 and a control circuit 14, wherein the output control component 12 may have a control terminal EC, a first terminal E1 and a second terminal E2, and the control terminal EC of the output control component 12 is coupled to the control circuit 14. The first terminal E1 of the output control component 12 may be used to receive an input signal SI, and the second terminal E2 of the output control component 12 may be used to provide an output signal SO to an electronic component (e.g., an electronic component 16 shown in FIG. 4). In other words, the input signal SI needs to pass through the output control component 12 to form the output signal SO, so that the output control component 12 may be used as a switch between one terminal for receiving the input signal SI and the other terminal for providing the output signal SO. Therefore, when the input signal SI is abnormal, the output control component 12 may be turned off to avoid the abnormal output signal so being transmitted to the electronic component, thereby reducing the impact on the operation of the electronic component.

Figure 5:
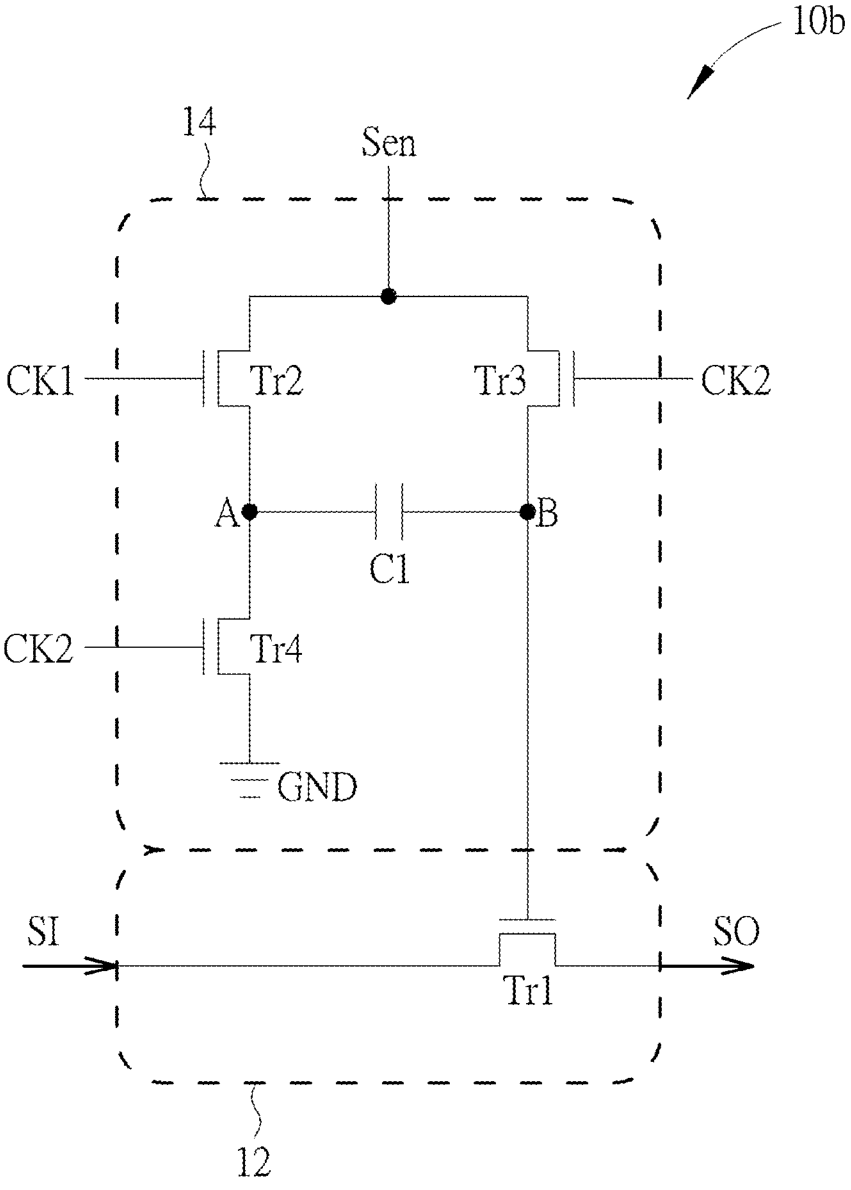
FIG. 5 schematically illustrates a signal control circuit according to a second embodiment of the present disclosure.

In the embodiment of FIG. 1, the output control component 12 may include a transistor Tr1 or be composed of a transistor Tr1, but not limited thereto. The transistor Tr1 shown in FIG. 1 may be a P-type transistor, but not limited thereto. In another embodiment, the transistor Tr1 may be an N-type transistor, as shown in FIG. 5.

The control circuit 14 may be used to generate a signal to control on or off of the output control component 12.

Further, as shown in FIG. 1, the control circuit 14 may include a capacitor C1 and a plurality of transistors. In the control circuit 14, the transistors may each include a first terminal E1, a second terminal E2 and a control terminal EC, and the transistors may include a transistor Tr2, a transistor Tr3 and a transistor Tr4. In addition, the first terminal E1 of the transistor Tr2 is coupled to the first terminal E1 of the transistor Tr3 and is used to receive an enable signal Sen, and the second terminal E2 of the transistor Tr2 and the second terminal E2 of the transistor Tr3 are respectively coupled to two terminals of the capacitor C1. The first terminal E1 and the second terminal E2 of the transistor Tr4 are respectively coupled to the second terminal E2 of the transistor Tr2 and a ground terminal GND. The control terminal EC of the transistor Tr3 and the control terminal EC of the transistor Tr4 are used to receive a first clock signal CK1, and the control terminal EC of the transistor Tr2 is used to receive a second clock signal CK2. The first clock signal CK1 and the second clock signal CK2 may be generated by a timing controller in an electronic device to which the signal control circuit 10*a* is applied, but not limited thereto. In the embodiment of FIG. 1, the two terminals of the capacitor C1 may be a node A and a node B, respectively, wherein the node B may be coupled to the control terminal EC of the output control component 12, so that signal on the node B may control on or off of the output control component 12. It is noted that it may help reduce or eliminate the difference between the input signal SI and the output signal SO to couple the control circuit 14 to the control terminal EC of the output control component 12.

In the present embodiment, the transistors of the control circuit 14 may each be the P-type transistor, but not limited thereto. In another embodiment, the transistors of the control circuit 14 may each be the N-type transistor, as shown in FIG. 5. In the embodiment of FIG. 1, the transistors of the control circuit 14 and the transistor Tr1 of the output control component 12 may be of the same type, and for example, each transistor is the P-type transistor or the N-type transistor, which may help to reduce the number of steps or complexity of manufacturing the control circuit 14 and the output control component 12. In some embodiments, the type of the transistors of the control circuit 14 may be different from the type of the transistor Tr1 of the output control component 12, and for example, while the transistor of the control circuit 14 is the P-type transistor, the transistor Tr1 is the N-type transistor, or vice versa.

Figure 2:
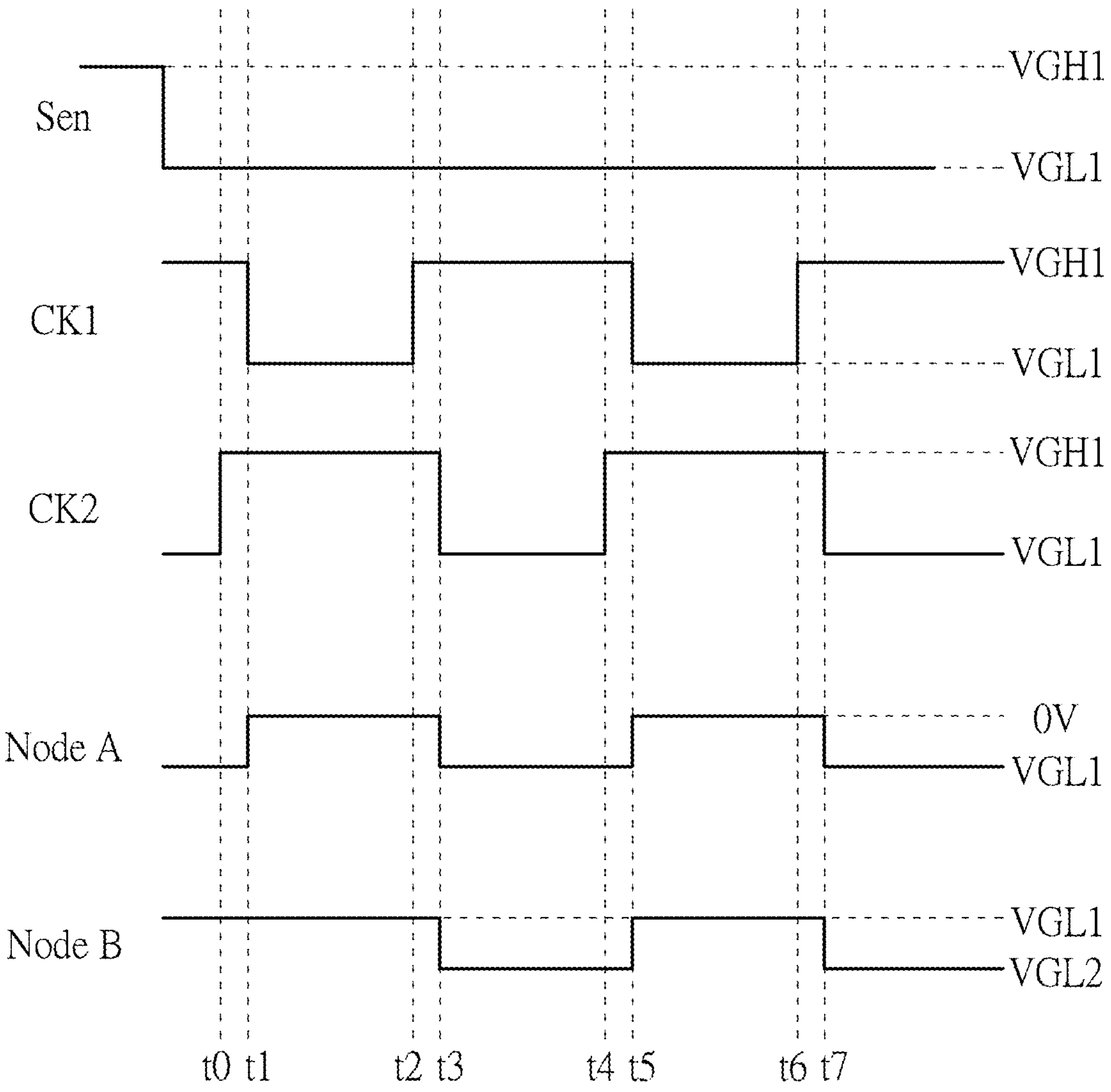
FIG. 2 schematically illustrates a timing diagram of turning on the output control component according to the first embodiment of the present disclosure.
Figure 3:
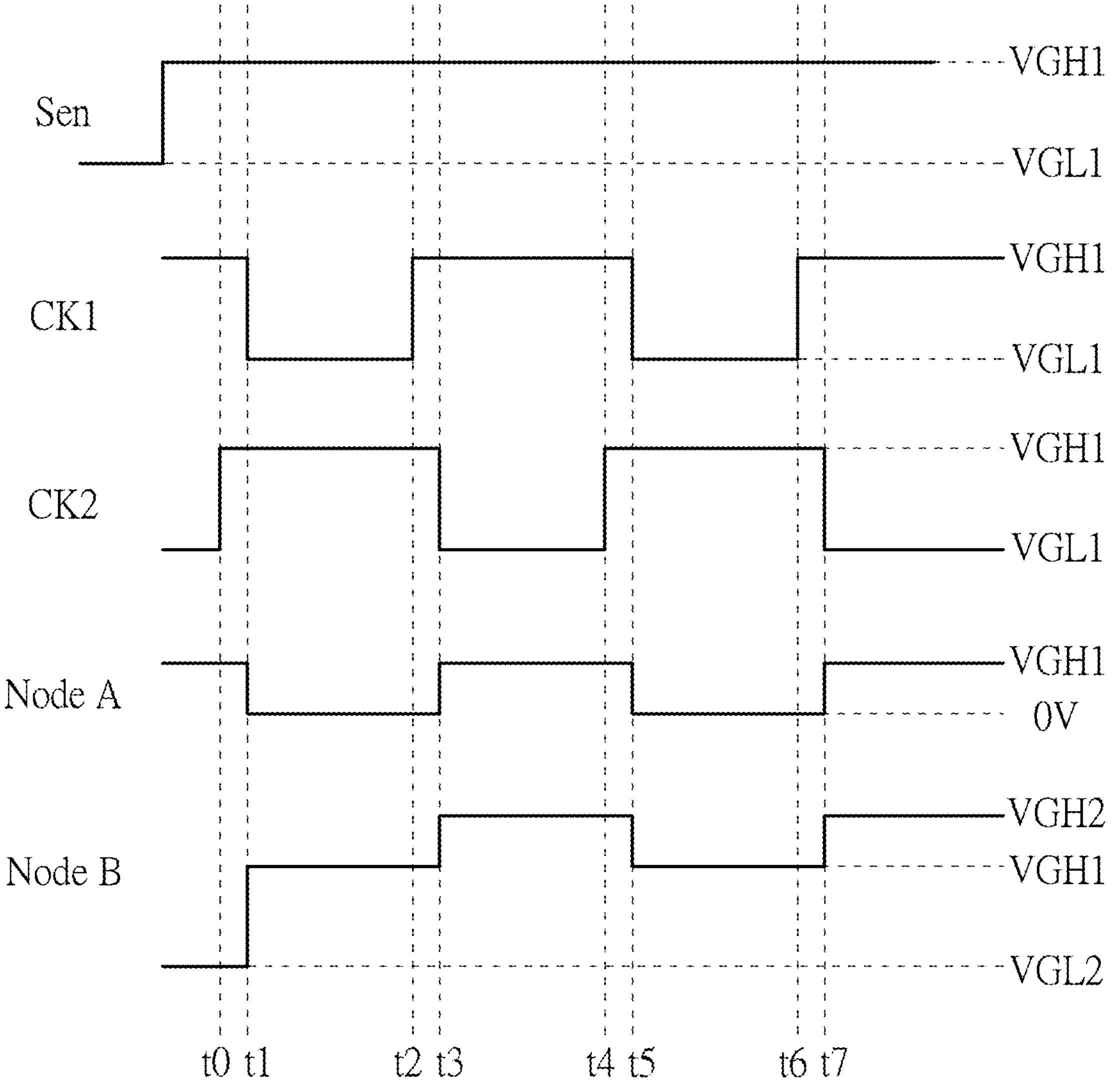
FIG. 3 schematically illustrates a timing diagram of turning off the output control component 12 according to the first embodiment of the present disclosure.

Please refer to FIG. 2 and FIG. 3. FIG. 2 schematically illustrates a timing diagram of turning on the output control component according to the first embodiment of the present disclosure, and FIG. 3 schematically illustrates a timing diagram of turning off the output control component 12 according to the first embodiment of the present disclosure. The following description further states a method for turning on or off the output control component 12 by the control circuit 14 with reference to FIG. 1, and the transistor Tr1, the transistor Tr2, the transistor Tr3 and the transistor Tr4 take the P-type transistors as an example for illustration, but the present disclosure is not limited thereto. As shown in FIG. 1 and FIG. 2, when the input signal SI is not abnormal, the voltage of the enable signal Sen may be switched to the first low voltage VGL1 before a time point t0, so that the first terminal E1 of the transistor Tr2 and the first terminal E1 of the transistor Tr3 of the control circuit 14 may receive a first low voltage VGL1. The first low voltage VGL1 may be, for example, less than 0 volts (V). In the present embodiment, the method for switching the voltage of the enable signal Sen may be, for example, manual or other suitable methods.

At the time point t0, the second clock signal CK2 may be switched from the first low voltage VGL1 to a first high voltage VGH1, so that the transistor Tr2 is in an off state. The first high voltage VGH1 may be, for example, greater than 0 V. At a time point t1 after time point t0, the first clock signal CK1 may be switched to the first low voltage VGL1, so that the transistor Tr3 and the transistor Tr4 are in an on state. In an embodiment that the transistor Tr2, the transistor Tr3 and the transistor Tr4 are P-type, durations of the first clock signal CK1 at the first low voltage VGL1 and durations of the second clock signal CK2 at the first low voltage VGL1 may not overlap, but not limited thereto. In some embodiments, when the transistor Tr2, the transistor Tr3 and the transistor Tr4 are N-type, and the first clock signal CK1 and the second clock signal CK2 are transmitted to the N-type transistor, durations of the first clock signal CK1 at the first high voltage VGH1 and durations of the second clock signal CK2 at the first high voltage VGH1 may not overlap, but not limited thereto.

Since the second terminal E2 of the transistor Tr4 is coupled to the ground terminal GND with a voltage of 0 V, the voltage of the node A may be pulled to 0 V at the time point t1. In addition, the first terminal E1 of the transistor Tr3 may receive the enable signal Sen, and at this time, the enable signal Sen is at the first low voltage VGL1, so that at the time point t1, the voltage of the node B may be maintained at or pulled to the first low voltage VGL1.

Afterwards, at a time point t2, the first clock signal CK1 is switched from the first low voltage VGL1 to the first high voltage VGH1, which may turn off the transistor Tr3 and the transistor Tr4. At this time, the node A may be maintained at 0 V, and the node B may be maintained at the first low voltage VGL1. At a time point t3, the second clock signal CK2 may be switched from the first high voltage VGH1 to the first low voltage VGL1, which may turn on the transistor Tr2 to be in the on state, so that the node A may be pulled to the first low voltage VGL1 that is the same as the voltage of the enable signal Sen. Since the capacitor C1 is coupled between the node A and the node B, and the transistor Tr2 is in the off state, the voltage of the node B may be coupled with the voltage of the node A, such that the voltage of the node B may be further pulled to a second low voltage VGL2 due to the change of the voltage of the node A from 0 V to the first low voltage VGL1. In other words, the second low voltage VGL2 may be lower than the first low voltage VGL1.

At a time point t4 after the time point t3, the second clock signal CK2 repeats the action at time point t0, and the voltage of the second clock signal CK2 is pulled up to the first high voltage VGH1 to turn off transistor Tr2, such that the node A may be maintained at the first low voltage VGL1. Then, in a duration from a time point t5 to a time point t7, the first clock signal CK1 and the second clock signal CK2 repeat the action from the time point t1 to the time point t3, so that the voltage of the node A may be pulled up to 0 V again and then pulled to the first low voltage VGL1, and the voltage of the node B is pulled to the first low voltage VGL1 again and then pulled to the second low voltage VGL2. Therefore, when the enable signal Sen is at the first low voltage VGL1, the voltage of the node B may be switched between the first low voltage VGL1 and the second low voltage VGL2.

In some embodiments, the following gate driving circuits (e.g., a gate driving circuit 181 and a gate driving circuit 182 in FIG. 4, FIG. 6 and FIG. 11 to FIG. 13) may receive the first clock signal CK1 and the second clock signal CK2.

As can be seen from FIG. 1 and FIG. 2, the voltage of the node B is the voltage of the control terminal EC of the output control component 12. Therefore, when the transistor Tr1 is P-type, and the voltage of the node B is the first low voltage VGL1 or the second low voltage VGL2, the transistor Tr1 of the output control component 12 may be turned on and be in the on state. Accordingly, the input signal SI may be transmitted to the electronic component through the transistor Tr1. In other words, switching the voltage of the enable signal Sen to the first low voltage VGL1 may turn on the output control component 12. Moreover, starting from the time point t1, the output control component 12 may be in the on state, such that the input signal SI may pass through the output control component 12 to become the output signal SO.

It should be noted that, the voltage of the node B may be pulled to the first low voltage VGL1 or the second low voltage VGL2 after the time point t1, such that the transistor Tr1 may be in the on state. Accordingly, the signal control circuit 10*a* may allow the input signal SI to pass through the output control component 12 to become the output signal SO after the time point t1 to be transmitted to the corresponding electronic component. In other words, the output control component 12 may be turned on by switching the voltage of the enable signal Sen to the first low voltage VGL1. Also, since the voltage of the node B may be pulled to the second low voltage VGL2 lower than the first low voltage VGL1 when the transistor Tr1 is in the on state, the voltage of the second terminal E2 of the transistor Tr1 while being in the on state may be close to or the same as the voltage of the first terminal E1. Therefore, the difference between the input signal SI and the output signal SO may be reduced or eliminated.

On the contrary, as shown in FIG. 1 and FIG. 3, when the input signal SI is abnormal, the enable signal Sen may be switched to the first high voltage VGH1 before the time point t0, so that the first terminal E1 of the transistor Tr2 and the first terminal E1 of the transistor Tr3 of the control circuit 14 may receive the first high voltage VGH1.

The first clock signal CK1 and the second clock signal CK2 shown in FIG. 3 may be the same as the first clock signal CK1 and the second clock signal CK2 of FIG. 2. At the time point t0, the second clock signal CK2 is switched to the first high voltage VGH1, such that the transistor Tr2 is in the off state. At the time point t1, the first clock signal CK1 is switched to the first low voltage VGL1, such that the transistor Tr3 and the transistor Tr4 are in the on state. Since the second terminal E2 of the transistor Tr4 is coupled to the ground terminal GND with the voltage of 0 V, the voltage of the node A may be pulled to 0 V at the time point t1. Furthermore, since the first terminal E1 of the transistor Tr3 is coupled to the enable signal Sen, and the enable signal Sen is at the first high voltage VGH1 at this time, the voltage of the node B may be pulled to the first high voltage VGH1 at the time point t1.

Then, at the time point t2, the first clock signal CK1 is switched to the first high voltage VGH1, such that the transistor Tr3 and the transistor Tr4 are turned off. At this time, the node A may be maintained at 0 V, and the node B may be maintained at the first high voltage VGH1. At the time point t3, the second clock signal CK2 is switched to the first low voltage VGL1, such that the transistor Tr2 is turned on to be in the on state. Accordingly, the node A may be pulled from 0 V to the first high voltage VGH1 that is the same as the enable signal Sen. Since the voltage of the node B is coupled with the voltage of the node A, and transistor Tr3 is in the off state, the voltage of the node B may be further pulled to the second high voltage VGH2 due to the change of the voltage of the node A from 0 V to the first high voltage VGH1. In other words, the second high voltage VGH2 may be higher than the first high voltage VGH1.

Subsequently, from the time point t4 to the time point t7, the second clock signal CK2 and the first clock signal CK1 repeat the action from the time point t0 to the time point t3, so that the voltage of the node A may be pulled from the first high voltage VGH1 to 0 V again and then pulled back to the first high voltage VGH1, and the voltage of the node B may be pulled from the second high voltage VGH2 to the first high voltage VGH1 again and then pulled back to the second high voltage VGH2. It can be seen that when the enable signal Sen is at the first high voltage VGH1, the voltage of the node B may be switched between the first high voltage VGH1 and the second high voltage VGH2.

When the transistor Tr1 is P-type, since the voltage of the node B may be pulled to the first high voltage VGH1 or the second high voltage VGH2 after the time point t1, the transistor Tr1 may be turned off. Therefore, the signal control circuit 10*a* may block the input signal SI from being output to the corresponding electronic component through the output control component 12 after the time point t1, thereby preventing the abnormal input signal SI from affecting the operation of the electronic component. In other words, switching the voltage of the enable signal Sen to the first high voltage VGH1 may turn off the output control component 12. Therefore, switching the voltage of the enable signal Sen may control on or off of the output control component 12.

In some embodiments, the methods for turning on and off the output control component 12 may be adjusted according to the type of the transistor Tr1 and/or the type of the transistors of the control circuit 14. For example, when the transistor Tr1 is N-type and the transistors of the control circuit 14 is P-type, the transistor Tr1 may be turned off by switching the enable signal Sen to the first low voltage VGL1 and may be turned on by switching the enable signal Sen to the first high voltage VGH1, but not limited thereto.

Figure 4:
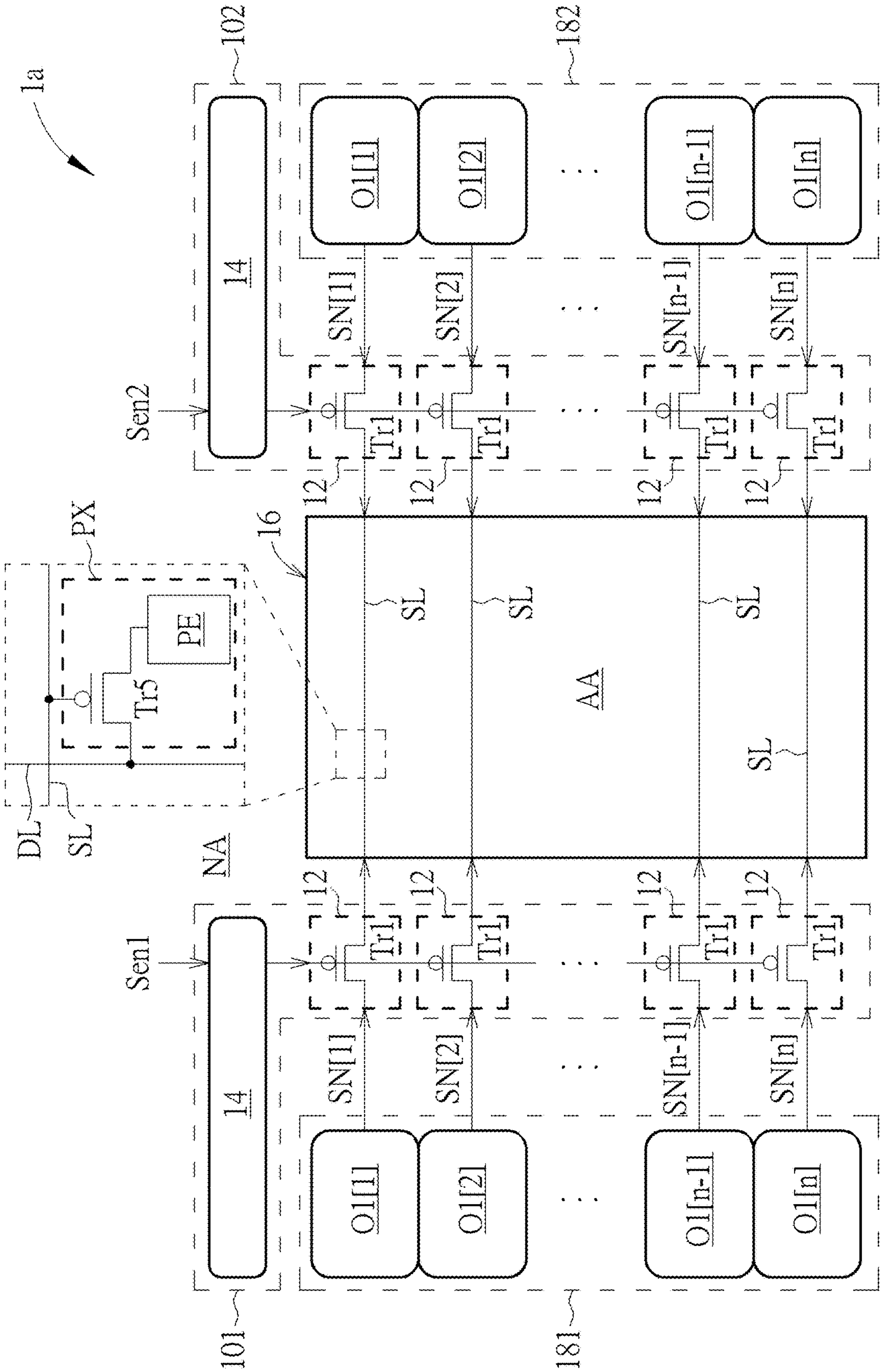
FIG. 4 schematically illustrates a partial circuit diagram of an electronic device according to the first embodiment of the present disclosure.

Please refer to FIG. 4, which schematically illustrates a partial circuit diagram of an electronic device according to the first embodiment of the present disclosure. As shown in FIG. 4, the electronic device 1*a* may have an active region AA and a non-active region NA, and the non-active region NA is disposed outside the active region AA. The electronic device 1*a* includes an electronic component 16, a gate driving circuit (GDC) 181 and a signal control circuit 101, wherein the signal control circuit 101 may include at least one output control component 12 and a control circuit 14. The electronic component 16 is disposed in the active region AA, and the gate driving circuit 181, the output control component 12 and the control circuit 14 are disposed in the non-active region NA. The control terminal of the output control component 12 is coupled to the control circuit 14, the first terminal of the output control component 12 is coupled to the gate driving circuit 181, and the second terminal of the output control component 12 is coupled to the electronic component 16. In other words, the output control component 12 may be coupled between the gate driving circuit 181 and the electronic component 16, and the output signal provided by the gate driving circuit 181 (e.g., a first stage scan signal SN[1] to an n-th stage scan signal SN[n] and/or a first stage emission control signal EM[1] to an n-th stage emission control signal EM[n] shown in FIG. 13) may be used as an input signal of the output control component 12 (e.g., the input signal SI shown in FIG. 1), and when the output control component 12 is turned on, the output signal transmitted to the electronic component 16 may be similar to or the same as the input signal. The signal control circuit 101 of the electronic device 1*a* of the present embodiment may adopt the signal control circuit 10*a* shown in FIG. 1, but not limited thereto. In some embodiments, the signal control circuit 101 may adopt a signal control circuit 10*b* of FIG. 5 mentioned below or other suitable signal control circuits.

In the electronic device 1*a* of the present embodiment, the signal control circuit 101 may include a plurality of output control components 12, and the control terminal of each of the output control components 12 may be coupled to the control circuit 14 of the signal control circuit 101, so that the control circuit 14 may control on or off of each of the output control components 12. The gate driving circuit 181 may include a plurality of output units, such as a first stage output unit O1[1] to an n-th stage output unit O1[n], respectively used to output a first stage output signal to an n-th stage output signal (e.g., the first stage scan signal SN[1] to the n-th stage scan signal SN[n]), and the output units O1[1]-O1[n] are respectively coupled to the first terminals of the corresponding output control components 12, so that the output control components 12 may respectively receive the first stage scan signal SN[1] to the n-th stage scan signal SN[n], where n is a positive integer.

As shown in FIG. 4, the electronic component 16 may include a plurality of scan lines SL respectively coupled to the second terminals of the corresponding output control components 12, so that when the output control components 12 are in the on state, the scan lines SL may respectively receive the first stage scan signal SN[1] to the n-th stage scan signal SN[n]. In one embodiment, the electronic component 16 may include a display component for displaying images. In this case, the active region AA may be a display region, and the non-active region NA may be a peripheral circuit region outside the display region, but not limited thereto.

In the embodiment of FIG. 4, the display component may, for example, include a non-self-emissive display panel. Specifically, the electronic component 16 may include at least one pixel PX. In the present embodiment, the electronic component 16 may include a plurality of pixels PX, each coupled to a corresponding scan line SL, wherein each of the pixels PX may include a switching transistor Tr5, and a control terminal of the switching transistor Tr5 may be coupled to the second terminal of the corresponding output control component 12 through one of the scan lines SL. In other words, the first stage scan signal SN[1] to the n-th stage scan signal SN[n] may, for example, be scan signals transmitted to different scan lines SL, respectively.

In the embodiment of FIG. 4, the electronic component 16 may further include a plurality of data lines DL, and each of the pixels PX may include a pixel electrode PE, wherein in each of the pixels PX, a first terminal of the switching transistor Tr5 may be coupled to the corresponding data line DL, and a second terminal of the switching transistor Tr5 may be coupled to the corresponding pixel electrode PE. In order to clearly illustrate the electronic component 16, an enlarged view on upper part of FIG. 4 shows a pixel PX, a data line DL and a scan line SL, but the present disclosure is not limited thereto.

In the embodiment of FIG. 4, the electronic device 1*a* may further include another gate driving circuit 182 and another signal control circuit 102 disposed in the non-active region NA, wherein the gate driving circuit 181 and the gate driving circuit 182 may be disposed on two opposite sides of the active region AA, respectively, and the signal control circuit 101 and the signal control circuit 102 may be disposed on two opposite sides of the active region AA, respectively. Further, the gate driving circuit 182 may be coupled to the electronic component 16 through the signal control circuit 102. The gate driving circuit 182 may be similar to or identical to the gate driving circuit 181 and may also include a first stage output unit O1[1] to an n-th stage output unit O1[n]. The gate driving circuit 181 and the gate driving circuit 182 may be integrated into a substrate of a display panel (i.e., a gate on panel (GOP)) or integrated into a semiconductor driving chip.

The signal control circuit 102 may adopt the above-mentioned signal control circuit 10*a* and may be similar to or the same as the signal control circuit 101, and the signal control circuit 102 may also include at least one output control component 12 and a control circuit 14, wherein a control terminal of the output control component 12 is coupled to the control circuit 14 of the signal control circuit 102, a first terminal of the output control component 12 is coupled to the gate driving circuit 182, and a second terminal of the output control component 12 is coupled to the electronic component 16.

In the embodiment of FIG. 4, the signal control circuit 102 may include a plurality of output control components 12, and the first stage output unit O1[1] to the n-th stage output unit O1[n] of the gate driving circuit 182 may respectively provide the first stage scan signal SN[1] to the n-th stage scan signal SN[n] to the output control components 12 of the signal control circuit 102. The signal control circuit 101 and the signal control circuit 102 may be respectively coupled to two ends of each scan line SL, so that the first stage scan signal SN[1] to the n-th stage scan signal SN[n] may be respectively transmitted to the corresponding scan lines SL through the output control components 12 of the signal control circuit 101 and the signal control circuit 102.

It should be noted that the control circuit 14 of the signal control circuit 101 and the signal control circuit 102 may be used to receive an enable signal Sen1 and an enable signal Sen2, respectively. In the embodiment of FIG. 4, the enable signal Sen1 and the enable signal Sen2 may be the same as the enable signal Sen of FIG. 1, and each of which may be switched to the enable signal Sen of FIG. 2 or FIG. 3 according to requirements. By providing the enable signal Sen1 and the enable signal Sen2 to the control circuit 14 of the signal control circuit 101 and the control circuit 14 of the signal control circuit 102 respectively, it is possible to control if the first stage scan signal SN[1] to the n-th stage scan signal SN[n] provided by the gate driving circuit 181 and the first stage scan signal SN[1] to the n-th stage scan signal SN[n] provided by the gate driving circuit 182 are provided to the scan lines SL. The method for controlling the on state and the off state of the corresponding output control component 12 by the enable signal Sen1 and the enable signal Sen2 may be referred to the above contents and will not be detailed redundantly here. In other words, when any one of the first stage scan signal SN[1] to the n-th stage scan signal SN[n] generated by one of the gate driving circuits 181 and the gate driving circuits 182 is abnormal, the output control components 12 of the corresponding signal control circuit may be turned off by changing the voltage of the corresponding enable signal Sen1 or enable signal Sen2 to prevent the abnormal scan signal from affecting the operation of the electronic component 16. In this case, the control circuit 14 of the other one of the signal control circuit 101 and the signal control circuit 102 (the signal control circuit corresponding to the other one of the gate driving circuit 181 and the gate driving circuit 182 that does not generate abnormal scan signals) may turn on the corresponding output control components 12, such that the first stage scan signal SN[1] to the n-th stage scan signal SN[n] generated by the other one of the gate driving circuit 181 and the gate driving circuit 182 may be provided to the electronic component 16. Accordingly, the electronic component 16 is still able to operate normally.

The signal control circuit and the electronic device of the present disclosure are not limited to the above-mentioned embodiment and may have other embodiments. To simplify the description, the other embodiments below will use the same reference numerals as the above-mentioned embodiment to denote the same components. In order to clearly describe the other embodiments, following contents will state differences between the other embodiments and the above-mentioned embodiments, and repeated parts will not be described in detail.

FIG. 5 schematically illustrates a signal control circuit according to a second embodiment of the present disclosure. As shown in FIG. 5, a difference between the signal control circuit 10*b* provided in the present embodiment and the signal control circuit 10*a* shown in FIG. 1 is that the transistor Tr1, the transistor Tr2, the transistor Tr3 and the transistor Tr4 of the present embodiment may be N-type transistors. In this case, the control terminal of the transistor Tr2 may receive the first clock signal CK1, and the control terminals of the transistor Tr3 and the transistor Tr4 may receive the second clock signal CK2. In some embodiments, when the transistors of the control circuit 14 are N-type transistors, the transistor Tr1 may be the P-type transistor. In some embodiments, the signal control circuit 10*b* of FIG. 5 may be applied to the signal control circuit 101 and/or the signal control circuit 102 of FIG. 4 or any of the following embodiments.

Since the type of the transistors in the present embodiment is opposite to that of the transistors of FIG. 1, the method for turning on and off the output control components 12 of the present embodiment may be opposite to the method for turning on and off the output control components 12 of the above embodiment. That is, the method for turning on the output control components 12 of the present embodiment may be the same as the method for turning off the output control components 12 of the above embodiment, as shown in FIG. 3. The method for turning off the output control components 12 of the present embodiment may be the same as the method for turning on the output control components 12 of the above embodiment, as shown in FIG. 2. Accordingly, they are not detailed redundantly. In some embodiments, when the transistor Tr1 is P-type, and the transistors of the control circuit 14 are N-type, the transistor Tr1 may be turned off by switching the enable signal Sen to the first high voltage VGH1 and may be turned on by switching the enable signal Sen to the first low voltage VGL1, but not limited thereto.

Figure 6:
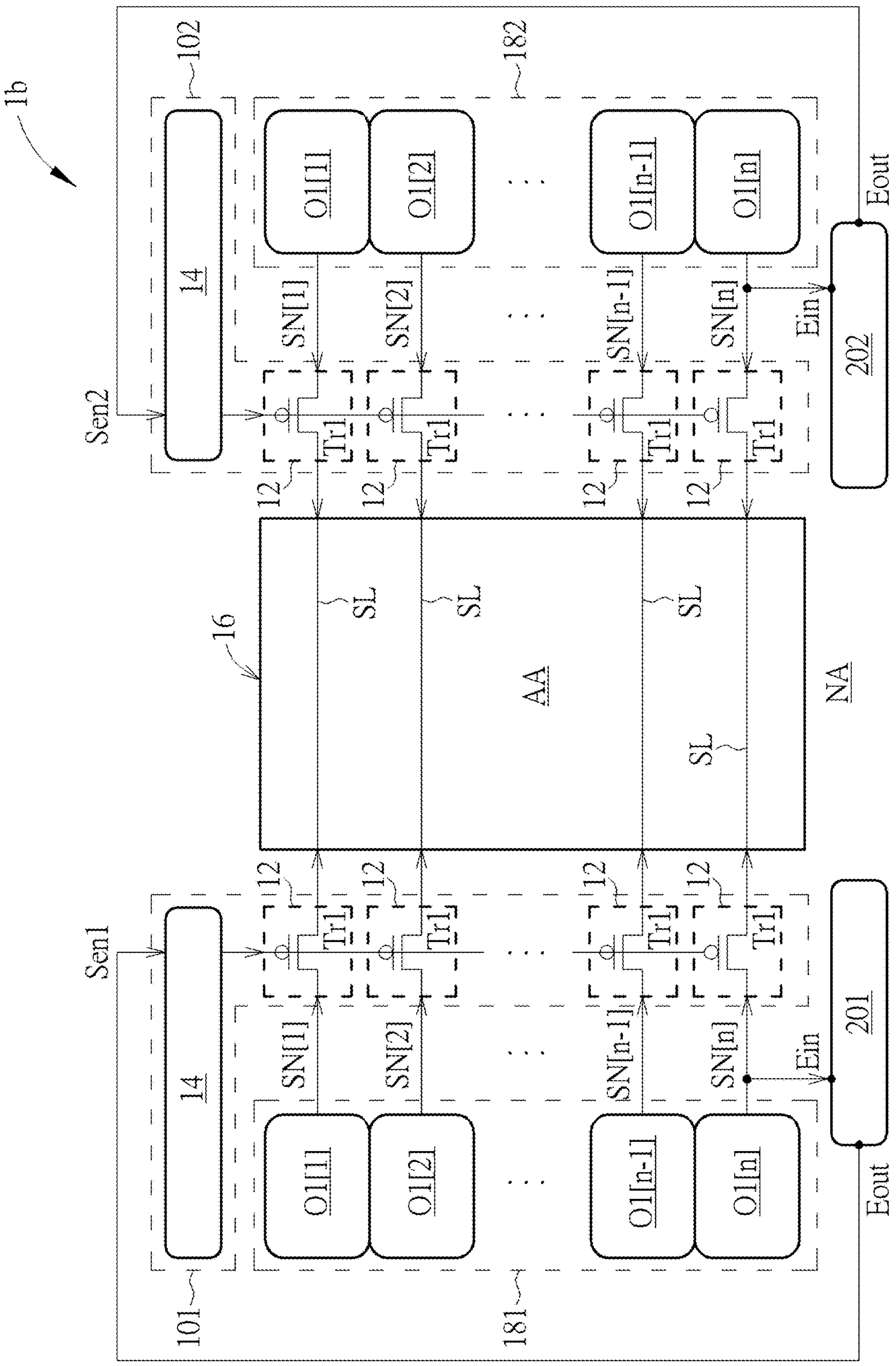
FIG. 6 schematically illustrates a partial circuit diagram of an electronic device according to a third embodiment of the present disclosure.

Please refer to FIG. 6, which schematically illustrates a partial circuit diagram of an electronic device according to a third embodiment of the present disclosure. As shown in FIG. 6, a difference between the electronic device 1*b* of the present embodiment and the electronic device 1*a* shown in FIG. 4 is that the electronic device 1*b* may further include a detecting circuit 201 disposed in the non-active region NA, and the detecting circuit 201 has an input terminal Ein and an output terminal Eout, wherein the input terminal Ein is coupled to the gate driving circuit 181, and the output terminal Eout is coupled to the control circuit 14 of the signal control circuit 101. The input terminal Ein of the detecting circuit 201 may be coupled to the n-th stage output unit O1[n] of the gate driving circuit 181 to receive the n-th stage scan signal SN[n]. The detecting circuit 201 may generate an enable signal Sen1 based on if the n-th stage scan signal SN[n] is abnormal and transmit the enable signal Sent from the output terminal Eout to the control circuit 14 of the signal control circuit 101, so that the control circuit 14 of the signal control circuit 101 may receive the enable signal Sen1 and control on or off of each of the output control components 12.

In the embodiment of FIG. 6, the electronic device 1*b* may further include another detecting circuit 202 disposed in the non-active region NA, and the detecting circuit 202 may also have an input terminal Ein and an output terminal Eout, wherein the input terminal Ein is coupled to the n-th stage output unit O1[n] of the gate driving circuit 182 to receive the n-th stage scan signal SN[n], and the output terminal Eout is coupled to the control circuit 14 of the signal control circuit 102. The input terminal Ein of the detecting circuit 202 may receive the n-th stage scan signal SN[n] output by the gate driving circuit 182, and the detecting circuit 202 may generate an enable signal Sen2 based on if the n-th stage scan signal SN[n] of the gate driving circuit 182 is abnormal, so that the control circuit 14 of the signal control circuit 102 may receive the enable signal Sen1 and control on or off of each of the output control components 12.

As shown in FIG. 6, the detecting circuit 201 and the control circuit 14 of the signal control circuit 101 may be independent of each other, but not limited thereto. In some embodiments, the detecting circuit 201 and the control circuit 14 of the signal control circuit 101 may be integrated into the same circuit. Similarly, the detecting circuit 202 and the control circuit 14 of the signal control circuit 102 may be independent of each other or integrated into the same circuit, but not limited thereto.

It should be noted that since the output units O1[1]-O1[n] are sequentially connected in series, when at least one of the output units of the gate driving circuit 181 generates abnormal scan signal, all the output units connected in series after the at least one output unit also will generate abnormal scan signals. In the present embodiment, the corresponding enable signal Sen1 may be generated by the detecting circuit 201 after detecting if the n-th stage scan signal SN[n] generated by the last stage input unit O1[n] is abnormal, so as to control on or off of each of the output control components 12 of the signal control circuit 101.

With this configuration, the detecting circuit 201 may immediately turn off the signals provided from the gate driving circuit 181 to the electronic component 16 after the gate driving circuit 181 generates abnormal scan signal, and the other gate driving circuit 182 may provide normal first to n-th stage scan signals SN[1]-SN[n] to the electronic component 16. Accordingly, the electronic component 16 is still able to operate normally, and the time that the user sees the abnormal image may be reduced. On the contrary, when at least one of the output units of the gate driving circuit 182 is abnormal, the detecting circuit 202 may detect the abnormal n-th stage scan signal SN[n] to generate the enable signal Sen2, thereby immediately turning off the signals provided from the gate driving circuit 182 to the electronic component 16. In this case, the gate driving circuit 181 provides normal first to n-th stage scan signals SN[1]-SN[n] to the electronic component 16.

Figure 7:
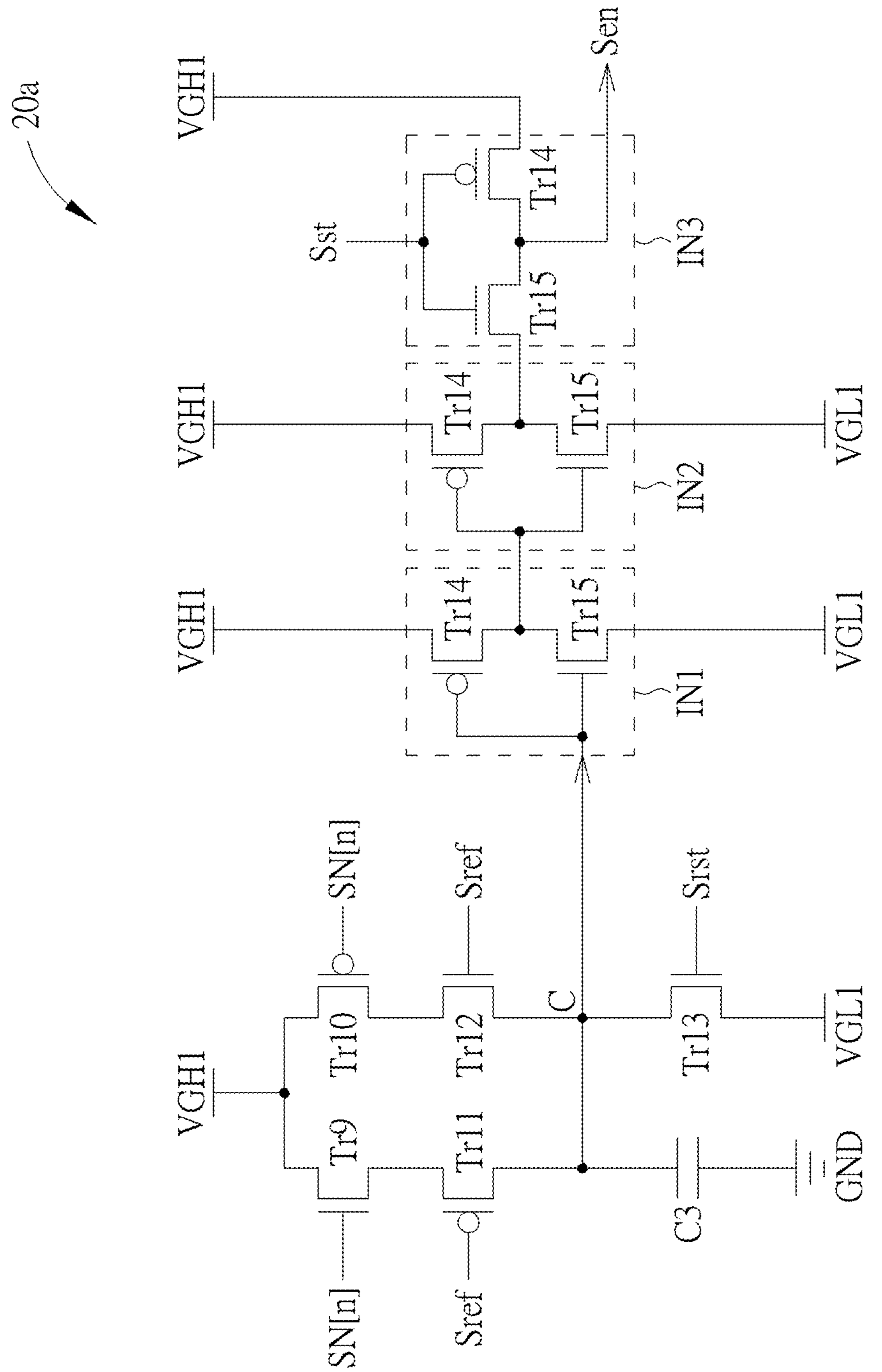
FIG. 7 schematically illustrates a detecting circuit according to an embodiment of the present disclosure.

Please refer to FIG. 7, which schematically illustrates a detecting circuit according to an embodiment of the present disclosure. As shown in FIG. 7, the detecting circuit 20*a* provided by the present embodiment may include a transistor Tr9, a transistor Tr10, a transistor Tr11, a transistor Tr12, a transistor Tr13 and a capacitor C3, wherein the transistor Tr9, the transistor Tr12 and the transistor Tr13 may be N-type transistors, and the transistor Tr10 and the transistor Tr11 may be P-type transistors. In the present embodiment, the control terminal of the transistor Tr9 and the control terminal of the transistor Tr10 are coupled to the n-th stage output unit O1[n] and receive the n-th stage scan signal SN[n], and the first terminal of the transistor Tr9 and the first terminal of the transistor Tr10 are coupled to a high voltage source that provides the first high voltage VGH1. The second terminal of the transistor Tr9 may be coupled to the first terminal of the transistor Tr11, the second terminal of the transistor Tr10 may be coupled to the first terminal of the transistor Tr12, and the second terminal of the transistor Tr11 and the second terminal of the transistor Tr12 may be coupled to a node C. The control terminal of the transistor Tr11 and the control terminal of the transistor Tr12 may receive a reference signal Sref, and the control terminal of transistor Tr13 may receive a reset signal Srst. Furthermore, the capacitor C3 may be coupled between the node C and the ground terminal GND, and the first terminal and the second terminal of the transistor Tr13 may be coupled to the node C and a low voltage source providing the first low voltage VGL1, respectively. The reference signal Sref may be preset as the n-th stage scan signal SN[n] in normal state, and the detecting circuit 20*a* may detect if the n-th stage scan signal SN[n] is abnormal by determining if the durations of the n-th stage scan signal SN[n] at the high voltage and the low voltage are respectively the same as the durations of the reference signal Sref at the high voltage and the low voltage.

In the embodiment of FIG. 7, the detecting circuit 20*a* may further include an inverter IN1, an inverter IN2 and an inverter IN3, wherein each of the inverter IN1, the inverter IN2 and the inverter IN3 includes a transistor Tr14 and a transistor Tr15. The transistor Tr14 may be a P-type transistor, and the transistor Tr15 may be an N-type transistor. In each of the inverter IN1, the inverter IN2 and the inverter IN3, the control terminal of the transistor Tr14 may be coupled to the control terminal of the transistor Tr15 and serve as an input terminal of the corresponding inverter, and the first terminal of the transistor Tr14 may be coupled to the first terminal of the transistor Tr15 and serve as an output terminal of the corresponding inverter. The input terminal of the inverter IN1 may be coupled to the node C, and the output terminal of the inverter IN1 may be coupled to the input terminal of the inverter IN2. The voltage level of the node C may be latched at the output terminal of the inverter IN2 by sequentially connecting the inverter IN1 and the inverter IN2 in series at the node C. In the inverter IN1 and the inverter IN2, the second terminal of the transistor Tr14 may be coupled to the first high voltage VGH1, and the second terminal of the transistor Tr15 may be coupled to the first low voltage VGL1. The input terminal of the inverter IN3 may receive a frame starting signal Sst, and the output terminal of the inverter IN3 may be used to output the enable signal Sen. In the inverter IN3, the second terminal of the transistor Tr14 may be coupled to the first high voltage VGH1, and the second terminal of the transistor Tr15 may be coupled to the output terminal of the inverter IN2.

The detecting circuit 20*a* shown in FIG. 7 may be applied to the detecting circuit 201 and/or the detecting circuit 202 of FIG. 6 or any of the following embodiments. It should be noted that the detecting circuit 20*a* shown in FIG. 7 is just an example and is not used to limit the detecting circuit of the present disclosure. In some embodiments, the detecting circuit 201 and/or the detecting circuit 202 of FIG. 6 or any of the following embodiments may adopt other types of circuit structures according to requirements. The detecting circuit 20*a* of FIG. 7 may not be limited to be applied to the embodiment in which the transistors included in the control circuit and the output control components are P-type. In some embodiments, according to the voltage of the required enable signal, a connecting structure of the transistor Tr9, the transistor Tr10, the transistor Tr11 and the transistor Tr12, the number of the inverters coupled between the node C and the inverter IN3 and/or other suitable circuit structures may be adjusted to detect abnormal n-th scan signal SN[n] and provide a suitable enable signal. For example, when the transistors included in the control circuit and the output control components are N-type, the first high voltage VGH1 provided to the first terminal of the transistor Tr9 and the first terminal of the transistor Tr10 and the first low voltage VGL1 provided to the second terminal of the transistor Tr13 may be interchanged with each other, and the second terminal of the transistor Tr14 may be provided with the first low voltage VGL1, but not limited thereto.

Figure 8:
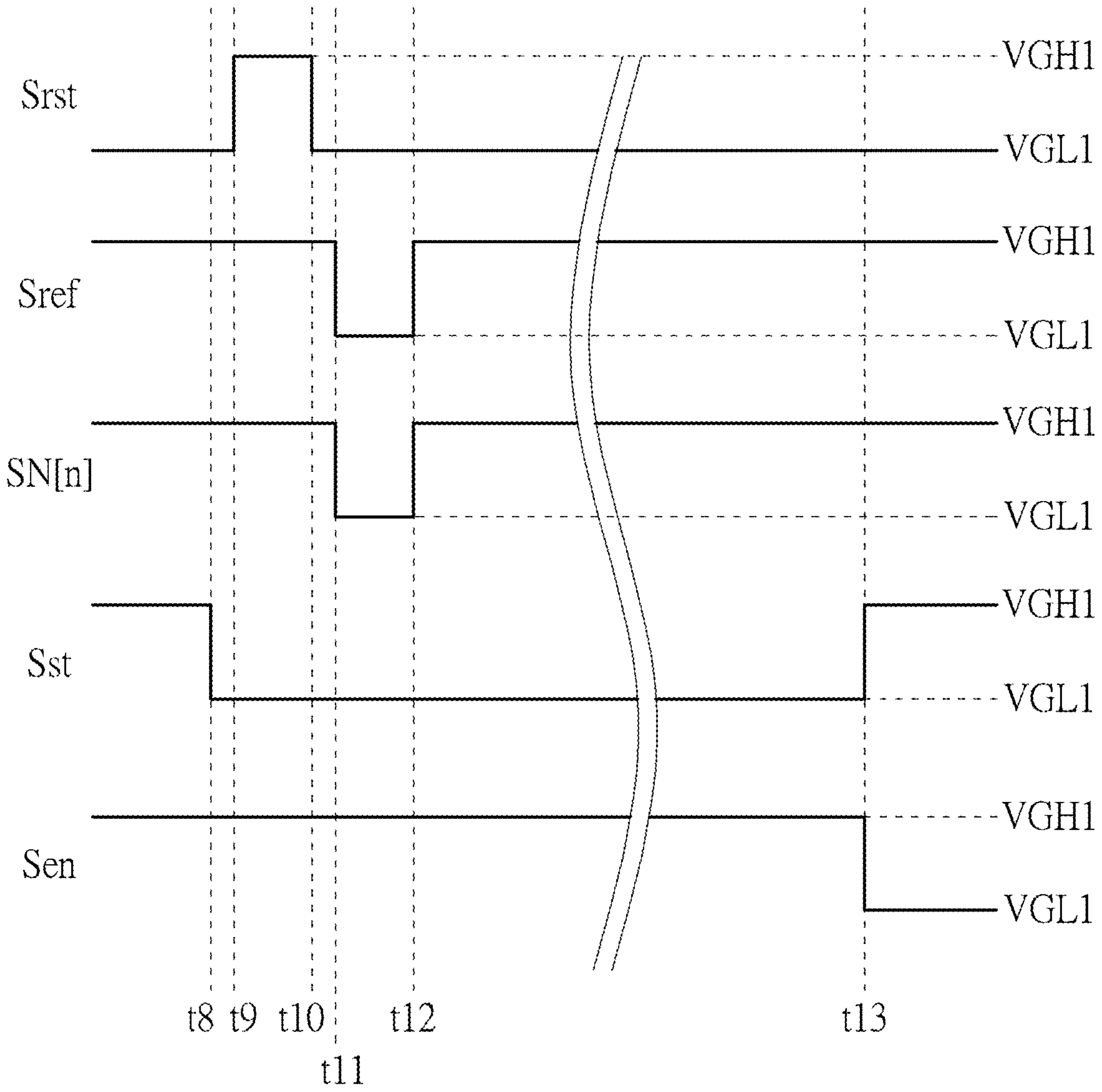
FIG. 8 schematically illustrates a timing diagram of a normal n-th stage scan signal detected by a detecting circuit according to an embodiment of the present disclosure.

Please further refer to FIG. 8, which schematically illustrates a timing diagram of a normal n-th stage scan signal detected by a detecting circuit according to an embodiment of the present disclosure. Following contents will further state a method for operating the detecting circuit 20*a* to detect the normal n-th stage scan signal SN[n] with reference to FIG. 7. As shown in FIG. 7 and FIG. 8, at a time point t8, the voltage of the frame starting signal Sst decreases from the first high voltage VGH1 to the first low voltage VGL1, and the voltage of the frame starting signal Sst continues to be the first low voltage VGL1 until a time point t13 and then be pulled back to the first high voltage VGH1. In other words, when the voltage of the frame starting signal Sst remains at the first low voltage VGL1, which may, for example, represent that the electronic device (e.g., an electronic device 1*b* of FIG. 6) finishes displaying a frame and is in a blanking interval before displaying another frame, and the detecting circuit 20*a* may detect the n-th stage scan signal SN[n] in a duration (i.e., the blanking interval) from the time point t8 to the time point t13. At this time, the transistor Tr14 of the inverter IN3 may be turned on, so that the output terminal of the inverter IN3 may provide the first high voltage VGH1; that is, the voltage of the enable signal Sen is at the first high voltage VGH1.

At a time point t9 between the time point t8 and the time point t13, the voltage of the reset signal Srst may be pulled up from the first low voltage VGL1 to the first high voltage VGH1 to turn on the transistor Tr13 and reset the voltage of the node C to the first low voltage VGL1. Then, at a time point t10, the voltage of the reset signal Srst decreases from the first high voltage VGH1 back to the first low voltage VGL1 to turn off the transistor Tr13, so that the voltage of the node C may be maintained at the first low voltage VGL1.

In a duration from the time point t8 to the time point t11, the n-th stage scan signal SN[n] and the reference signal Sref may both be at the first high voltage VGH1, so that the transistor Tr9 and the transistor Tr12 may be turned on, and the transistor Tr10 and the transistor Tr11 may be turned off. Accordingly, the node C is not coupled to the first high voltage VGH1. In addition, the n-th stage scan signal SN[n] and the reference signal Sref may be pulled from the first high voltage VGH1 to the first low voltage VGL1 at the time point t11 and continue to be the first low voltage VGL1 until a time point t12. In a duration from the time point t11 to the time point t12, since the n-th stage scan signal SN[n] and the reference signal Sref are both at the first low voltage VGL1, the transistor Tr9 and the transistor Tr12 may be turned off at the same time, and the transistor Tr10 and the transistor Tr11 may be turned on at the same time. Therefore, the node C is also not coupled to the first high voltage VGH1. At the time point t12, the n-th stage scan signal SN[n] and the reference signal Sref may be pulled back from the first low voltage VGL1 to the first high voltage VGH1 and continue to be the first high voltage VGH1 until a time point t13, so that the transistor Tr9 and the transistor Tr12 may be turned on at the same time, and the transistor Tr10 and the transistor Tr11 are turned off at the same time. Thus, the node C is still not coupled to the first high voltage VGH1. It can be seen that when the durations of the n-th scan signal SN[n] at the low voltage and the high voltage in a time from the time point t8 to the time point t13 may be respectively the same as the durations of the reference signal Sref at the low voltage and the high voltage, the node C still continues to be at the first low voltage VGL1. When the node C is at the first low voltage VGL1, the output terminal of the inverter IN1 outputs the first high voltage VGH1 to the input terminal of the inverter IN2, and the output terminal of the inverter IN2 outputs the first low voltage VGL1 to the second terminal of the transistor Tr15 of the inverter IN3.

As shown in FIG. 7 and FIG. 8, the frame starting signal Sst ends the blank interval after the time point t13 and be pulled from the first low voltage VGL1 to the first high voltage VGH1, so that the transistor Tr14 and the transistor Tr15 of the inverter IN3 are turned off and turned on respectively. Hence, the voltage of the output terminal of the inverter IN3 decreases from the first high voltage VGH1 to the first low voltage VGL1 that is the same as the voltage of the second terminal of the transistor Tr15 of the inverter IN3, thereby outputting the enable signal Sen at the first low voltage VGL1. In other words, when the detecting circuit 20*a* determines that the n-th stage scan signal SN[n] is normal, the node C is at the first low voltage VGL1, such that the detecting circuit 20*a* provides the enable signal Sen at the first low voltage VGL after the time point t13.

When the detecting circuit 20*a* of the present embodiment is applied to the detecting circuit 201 shown in FIG. 6, the detecting circuit 201 may provide the enable signal Sen1 at the first low voltage VGL1 to the control circuit 14 of the signal control circuit 101 while detecting the normal n-th stage scan signal SN[n], so that the voltage of the node B of the control circuit 14 may be pulled to the first low voltage VGL1 or the second low voltage VGL2 as shown in FIG. 2 to turn on all the P-type transistors Tr1 of the corresponding signal control circuit 101. In this case, the first stage scan signal SN[1] to the n-th stage scan signal SN[n] generated by the gate driving circuit 181 may be transmitted to the electronic component through the transistors Tr1, respectively. Similarly, when the detecting circuit 20*a* is applied to the detecting circuit 202 shown in FIG. 6, the detecting circuit 202 may provide the enable signal Sen2 at the first low voltage VGL1 while detecting the normal n-th stage scan signal SN[n], so that the first stage scan signal SN[1] to the n-th stage scan signal SN[n] may be transmitted to the electronic component through the transistors Tr1, respectively.

Figure 9:
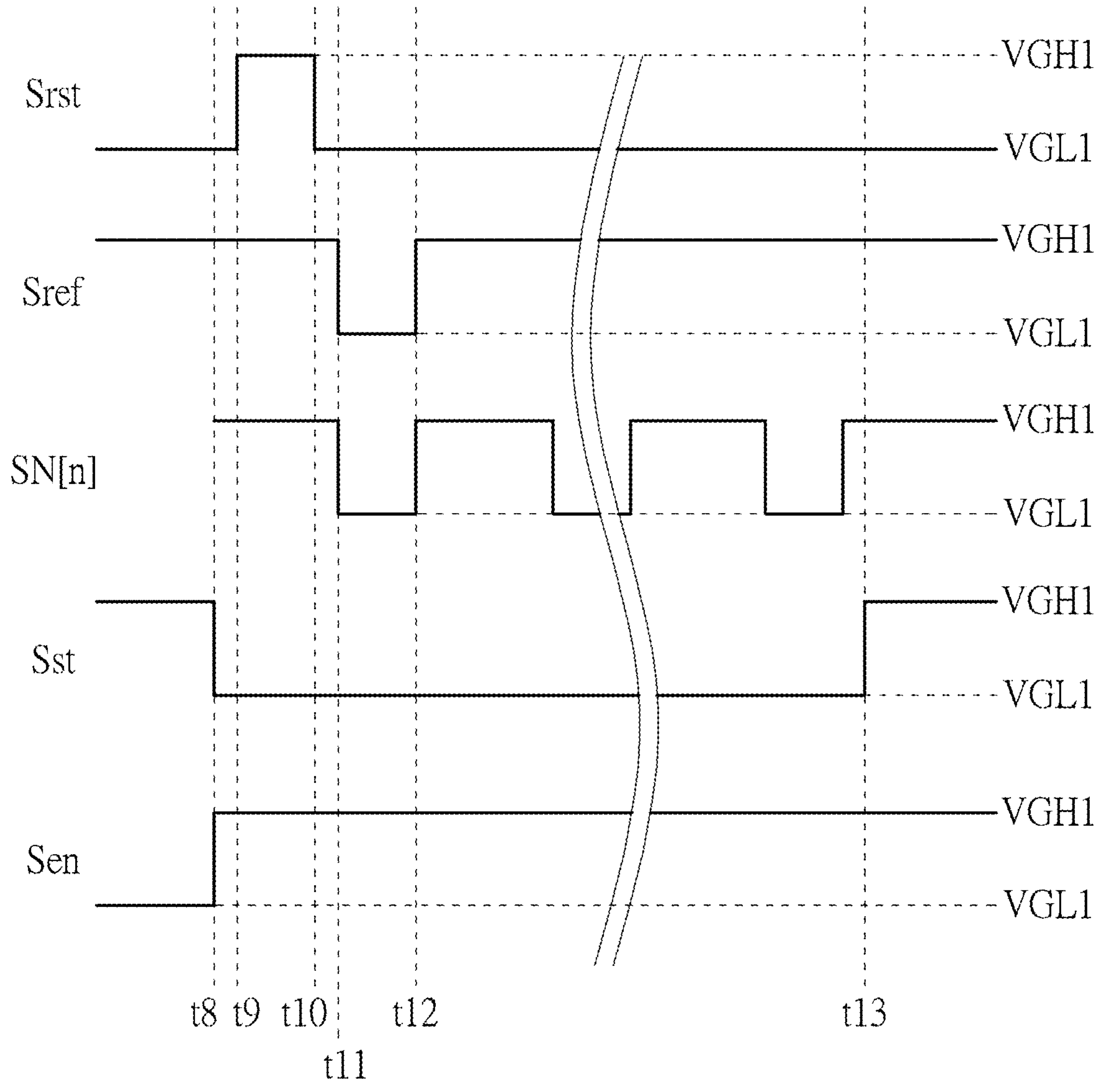
FIG. 9 schematically illustrates a timing diagram of an abnormal n-th stage scan signal detected by the detecting circuit according to an embodiment of the present disclosure.

FIG. 9 schematically illustrates a timing diagram of an abnormal n-th stage scan signal detected by the detecting circuit according to an embodiment of the present disclosure. Following contents will state a method for operating the detecting circuit 20*a* to detect the abnormal n-th stage scan signal SN[n] with reference to FIG. 7. As shown in FIG. 7 and FIG. 9, when the n-th stage scan signal SN[n] is abnormal, the durations of the n-th stage scan signal SN[n] at the high voltage and the low voltage are respectively different from the durations of the reference signal Sref at the high voltage and the low voltage. In the embodiment of FIG. 9, the n-th stage scan signal SN[n] may be at the first low voltage VGL1 in a portion of the duration between the time point t12 and the time point t13, which is different from the reference signal Sref being at the first high voltage VGH1 in the duration between the time point t12 and the time point t13. In some embodiments, the n-th stage scan signal SN[n] may be continuously at the first high voltage VGH1 or the first low voltage VGL1 in the duration between the time point t8 and the time point t13.

When the durations of the n-th stage scan signal SN[n] at the high voltage and the low voltage of are different from the durations of the reference signal Sref at the high voltage and the low voltage, the transistor Tr9 and the transistor Tr11 may be turned on at the same time, or the transistor Tr10 and the transistor Tr12 may be turned on at the same time, so that the node C may be coupled to the first high voltage VGH1. In this case, the output terminal of the inverter IN2 is at the first high voltage VGH1. When the frame starting signal Sst is pulled from the first low voltage VGL1 to the first high voltage VGH1, the detecting circuit 20*a* may output the enable signal Sen at the first high voltage VGH1.

In the case that the detecting circuit 20*a* of the present embodiment is applied to the detecting circuit 201 shown in FIG. 6, the detecting circuit 201 may provide the enable signal Sen1 at the first high voltage VGH1 to the control circuit 14 of the signal control circuit 101 as the detecting circuit 201 detects the abnormal n-th stage scan signal SN[n], such that the voltage of the node B of the control circuit 14 is pulled to the first high voltage VGH1 or the second high voltage VGH2 as shown in FIG. 3 to turn off all the P-type transistors Tr1 of the corresponding signal control circuit 101. Therefore, the first stage scan signal SN[1] to the n-th stage scan signal SN[n] generated by the gate driving circuit 181 are not transmitted to the electronic components, thereby avoiding the image displayed in the entire display region being abnormal or reducing the risk of overheating and burning out the electronic device due to short circuit. Similarly, in the case that the detecting circuit 20*a* is applied to the detecting circuit 202 shown in FIG. 6, the detecting circuit 202 may provide the enable signal Sen2 at the first high voltage VGH1 as the detecting circuit 202 detects the abnormal n-th stage scan signal SN[n] to prevent the first stage scan signal SN[1] to the n-th stage scan signal SN[n] generated by the gate driving circuit 182 from being transmitted to the electronic component.

Figure 10:
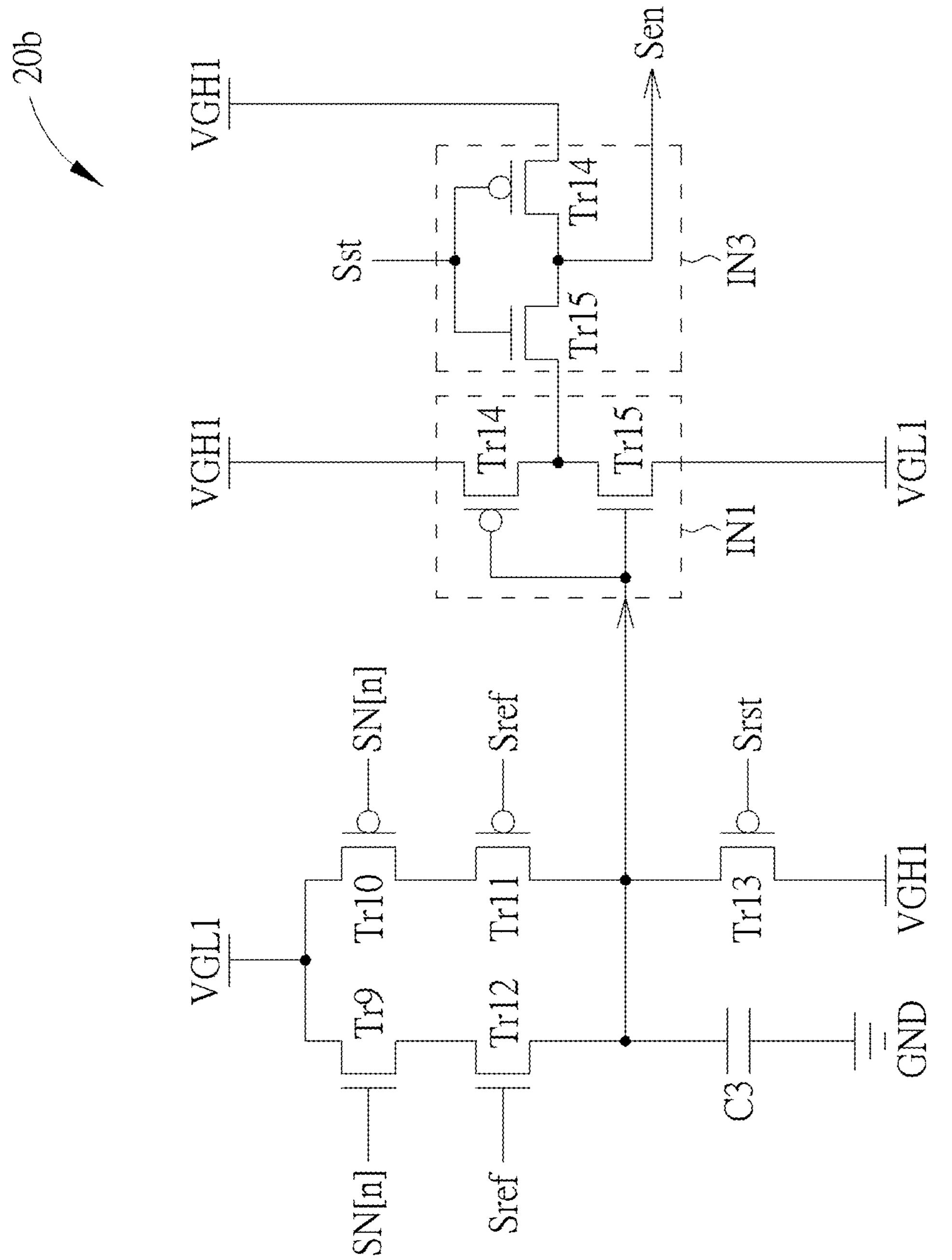
FIG. 10 schematically illustrates a detecting circuit according to another embodiment of the present disclosure.

Please refer to FIG. 10, which schematically illustrates a detecting circuit according to another embodiment of the present disclosure. As shown in FIG. 10, a difference between the detecting circuit 20*b* provided in the present embodiment and the detecting circuit 20*a* of FIG. 7 is that connecting positions of the transistor Tr11 and the transistor Tr12 may be interchanged with each other. In the present embodiment, the second terminal of the transistor Tr9 may be coupled to the first terminal of the transistor Tr12 instead of being directly coupled to the transistor Tr11, and the second terminal of the transistor Tr10 may be coupled to the first terminal of the transistor Tr11 instead of being directly coupled to the transistor Tr12. Also, the first terminals of the transistor Tr9 and the transistor Tr10 may be coupled to the first low voltage VGL1, and the second terminal of the transistor Tr13 may be coupled to the first high voltage VGH1. In the embodiment of FIG. 10, the detecting circuit 20*b* may not include the inverter IN2 of FIG. 7, such that the voltage of the node C is inverted with the enable signal Sen. In this case, the reference signal Sref is an inverted signal of the normal n-th stage scan signal SN[n]. Therefore, when the durations of the n-th stage scan signal SN[n] at the high voltage and the low voltage are at least partially the same as the durations of the reference signal Sref at the high voltage and the low voltage, respectively, the n-th stage scan signal SN[n] may be determined to be abnormal. The detecting circuit 20*b* shown in FIG. 10 may be applied to the detecting circuit 201 and/or the detecting circuit 202 of FIG. 6 or any of the following embodiments. In some embodiments, the detecting circuit herein is not limited to the detecting circuit 20*a* shown in FIG. 7 and the detecting circuit 20*b* shown in FIG. 10 and may be other suitable detecting circuits.

Figure 11:
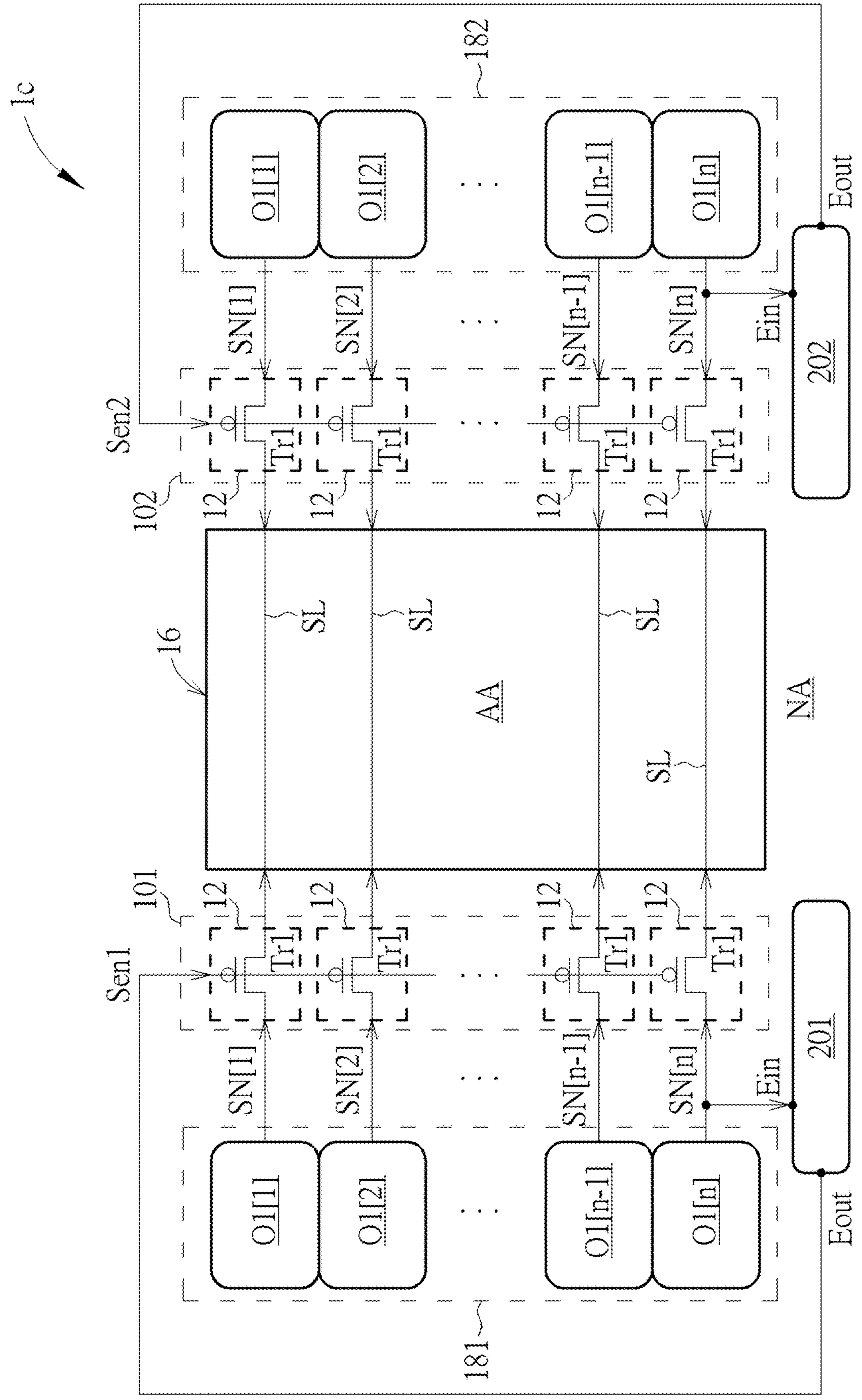
FIG. 11 schematically illustrates a partial circuit diagram of an electronic device according to a fourth embodiment of the present disclosure.

Please refer to FIG. 11, which schematically illustrates a partial circuit diagram of an electronic device according to a fourth embodiment of the present disclosure. As shown in FIG. 11, a difference between the electronic device 1*c* provided in the present embodiment and the electronic device 1*b* shown in FIG. 6 is that the signal control circuit 101 of the electronic device 1*c* may not include the control circuit 14. Specifically, the signal control circuit 101 may include a plurality of output control components 12, and the electronic device 1*c* may include the detecting circuit 201, wherein the input terminal Ein of the detecting circuit 201 is coupled to the gate driving circuit 181, and the output terminal Eout of the detecting circuit 201 may be coupled to the control terminal of each of the output control components 12 of the signal control circuit 101, so that the enable signal Sen1 generated by the detecting circuit 201 may be directly transmitted to the control terminals of all the output control components 12 of the signal control circuit 101.

In some embodiments, the signal control circuit 102 may not include the control circuit 14. In addition, the signal control circuit 102 may include a plurality of output control components 12, and the electronic device 1*c* may further include the detecting circuit 202. In this case, the output terminal Eout of the detecting circuit 202 may be coupled to the control terminals of the output control components 12 of the signal control circuit 102, such that the enable signal Sen2 generated by the detecting circuit 202 may be directly transmitted to the control terminals of all the output control components 12 of the signal control circuit 102.

The detecting circuit 201 adopting the detecting circuit 20*a* shown in FIG. 7 is taken as an example. The detecting circuit 201 may directly provide the enable signal Sen1 at the first low voltage VGL1 to all P-type transistors Tr1 of the signal control circuit 101 as the detecting circuit 201 detects the normal n-th stage scan signal SN[n], such that the electronic component may receive the first stage scan signal SN[1] to the n-th stage scan signal SN[n]. When the detecting circuit 201 detects the abnormal n-th stage scan signal SN[n], the enable signal Sen1 at the first high voltage VGH1 may be directly provided to all P-type transistors Tr1 of the signal control circuit 101, such that the electronic component does not receive the abnormal first stage scan signal SN[1] to the n-th stage scan signal SN[n]. In the embodiment of FIG. 11, the detecting circuit 202 may directly transmit the detected enable signal Sen2 to all P-type transistors Tr1 of the signal control circuit 102. In some embodiments, the detecting circuit 201 and the detecting circuit 202 of FIG. 11 may each be applied to the detecting circuit of any of the above embodiments. In some embodiments, the signal control circuit 101 and/or the signal control circuit 102 in FIG. 11 that does not include the control circuit 14 may alternatively be applied to the electronic device of any of the above or following embodiments.

Figure 12:
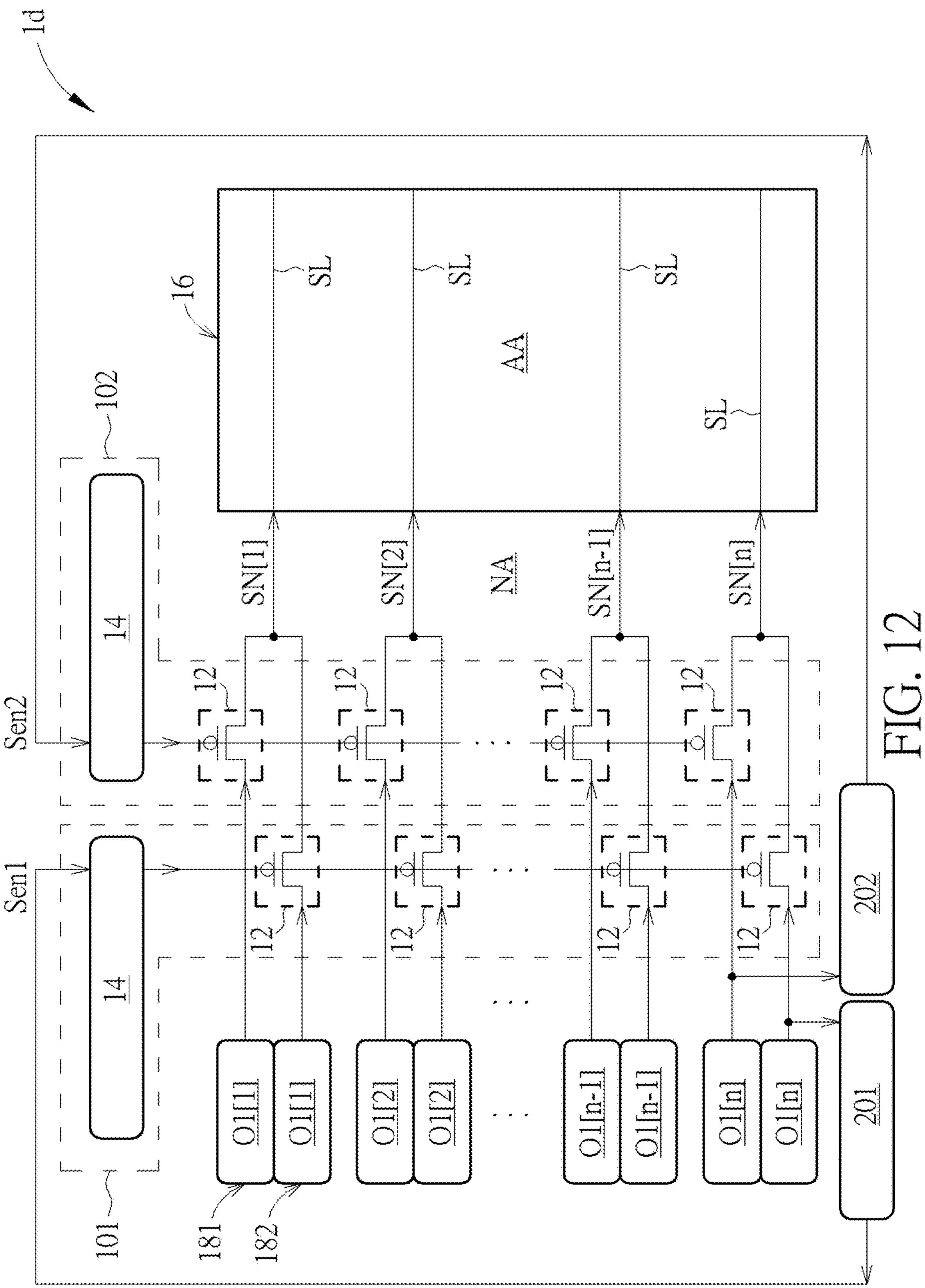
FIG. 12 schematically illustrates a partial circuit diagram of an electronic device according to a fifth embodiment of the present disclosure.

Please refer to FIG. 12, which schematically illustrates a partial circuit diagram of an electronic device according to a fifth embodiment of the present disclosure. As shown in FIG. 12, a difference between the electronic device 1*d* provided in the present embodiment and the electronic device 1*b* shown in FIG. 6 is that the gate driving circuit 181 and the gate driving circuit 182 may be disposed in the non-active region NA on the same side of the active region AA, and the signal control circuit 101 and the signal control circuit 102 may also be disposed in the non-active region NA on the same side of the active region AA. In the embodiment of FIG. 12, the first stage output unit O1[1] to the n-th stage output unit O1[n] of the gate driving circuit 181 and the first-stage output unit O1[1] to the n-th stage output unit O1[n] of the gate driving circuit 182 may be arranged alternately in sequence along a direction, but not limited thereto. Furthermore, the output terminals of the output control components 12 of the signal control circuit 101 may be respectively coupled to the output terminals of the corresponding output control components 12 of the signal control circuit 102 and coupled to the same ends of the corresponding scan lines SL.

In some embodiments, the structure in which the gate driving circuit 181, the gate driving circuit 182, the signal control circuit 101 and the signal control circuit 102 as shown in FIG. 12 are arranged on the same side of the active region AA may be applied to any electronic device in the above or following embodiments. In some embodiments, the electronic device 1*d* of FIG. 12 may optionally not include the control circuit 14 of the signal control circuit 101 and/or the control circuit 14 of the signal control circuit 102. Alternatively, the electronic device 1*d* of FIG. 12 may optionally not include the detecting circuit 201 and/or the detecting circuit 202.

Figure 13:
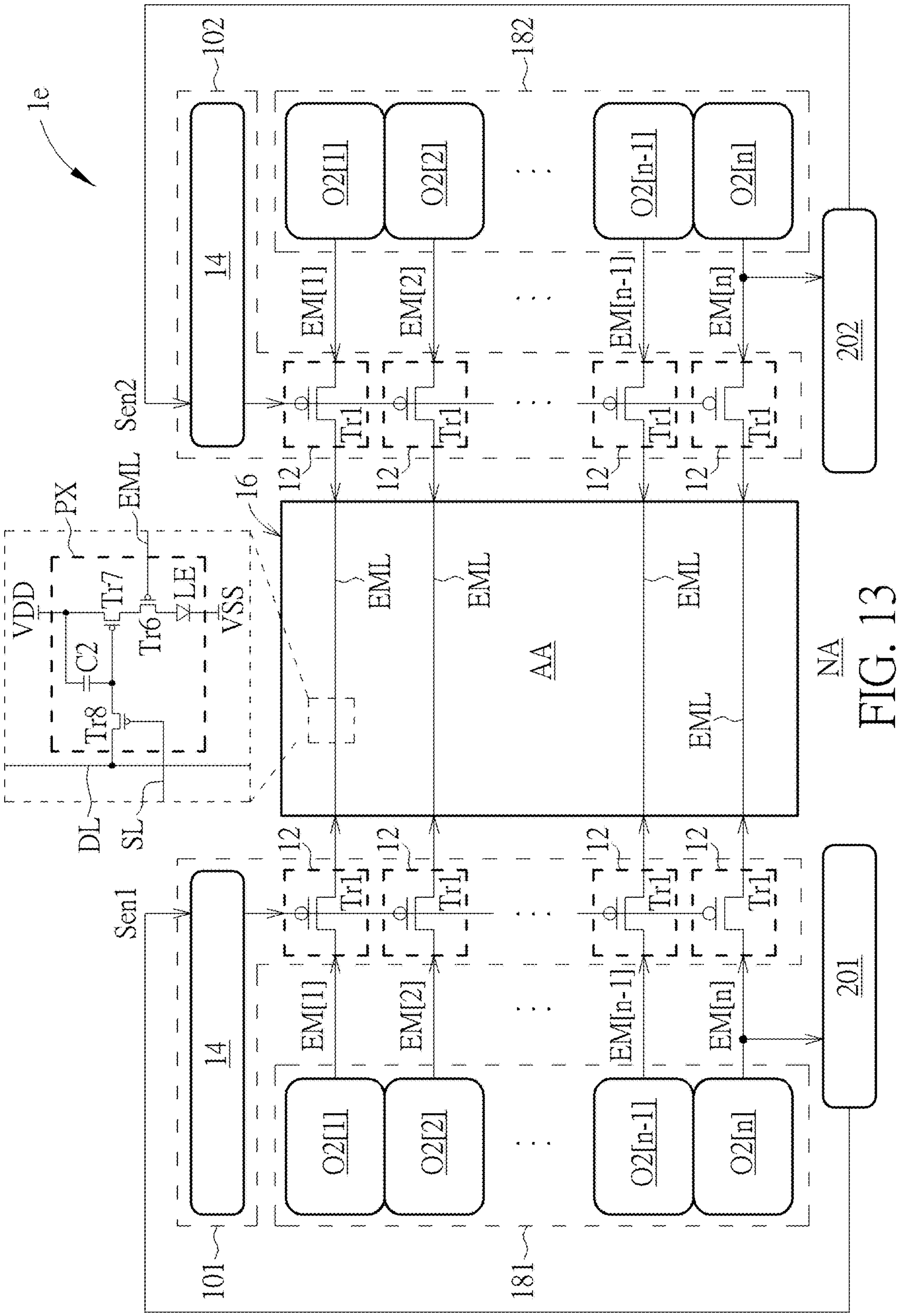
FIG. 13 schematically illustrates a partial circuit diagram of an electronic device according to a sixth embodiment of the present disclosure.

Please refer to FIG. 13, which schematically illustrates a partial circuit diagram of an electronic device according to a sixth embodiment of the present disclosure. As shown in FIG. 13, a difference between the electronic device 1*e* provided in the present embodiment and the electronic device 1*b* shown in FIG. 6 is that the electronic component 16 may include a self-emissive display panel for displaying images. In other words, the electronic component 16 may include a plurality of emission control lines EML respectively coupled to the second terminals of the corresponding output control components 12, such that the gate driving circuit 181 and the gate driving circuit 182 may each provide the first stage emission control signal EM[1] to the n-th stage emission control signal EM[n] to the electronic component 16 through the output control components 12.

The electronic component 16 may include at least one pixel PX. In the embodiment of FIG. 13, the electronic component 16 may include a plurality of pixels PX, wherein each pixel PX may include an emission control transistor Tr6 and a light emitting component LE, and the control terminal of the emission control transistor Tr6 is coupled to the corresponding emission control line EML to be further coupled to the second terminal of the corresponding output control component 12. The first terminal of the emission control transistor Tr6 may be coupled to one terminal (e.g., an anode) of the light emitting component LE, and the other terminal (e.g., a cathode) of the light emitting component LE may be coupled to a low voltage source VSS.

In FIG. 13, each pixel PX may further include a driving transistor Tr7, a switching transistor Tr8 and a capacitor C2. The first terminal and the second terminal of the driving transistor Tr7 are respectively coupled to the second terminal of the emission control transistor Tr6 and a high voltage source VDD, and the control terminal of the driving transistor Tr7 is coupled to the first terminal of the switching transistor Tr8. The second terminal and the control terminal of the switching transistor Tr8 may be respectively coupled to the corresponding data line DL and the corresponding scan line SL. The capacitor C2 may be coupled between the control terminal and the second terminal of the driving transistor Tr7. In the present embodiment, the pixel PX may be implemented, for example, with a configuration of three transistors and one capacitor (3T1C), but not limited thereto. In some embodiments, the pixel PX may alternatively adopt pixel circuits of other configurations, such as 4T2C, 7T2C or other types of configurations.

In the present embodiment, the gate driving circuit 181 may include a plurality of output units, for example the first stage output unit O2[1] to the n-th stage output unit O2[n] respectively used to output the first stage output signal to the n-th stage output signal (e.g., the first stage emission control signal EM[1] to the n-th stage emission control signal EM[n]), and the first stage output unit O2[1] to the n-th stage output unit O2[n] are respectively coupled to the first terminals of the corresponding output control components 12 in the signal control circuit 101, such that the output control components 12 may receive the first stage emission control signal EM[1] to the n-th stage emission control signal EM[n], respectively. In other words, the first stage emission control signal EM[1] to the n-th stage emission control signal EM[n] may be used as the input signals of the corresponding output control components 12 (e.g., the input signal SI shown in FIG. 1) and be transmitted to the corresponding emission control lines EML through the corresponding output control components 12, respectively.

In the embodiment of FIG. 13, the electronic device 1*e* may further include another gate driving circuit 182 and another signal control circuit 102 disposed in the non-active region NA, wherein the gate driving circuit 181 and the gate driving circuit 182 may be disposed at two opposite sides of the active region AA, respectively, and the signal control circuit 101 and the signal control circuit 102 may also be disposed at the two opposite sides of the active region AA, respectively. Also, the gate driving circuit 182 may be coupled to the electronic component 16 through the signal control circuit 102. The gate driving circuit 182 may be similar to or identical to the gate driving circuit 181 and may also include the first stage output unit O2[1] to the n-th stage output unit O2[n] used to output the first stage emission control signal EM[1] to the n-th stage emission control signal EM[n], respectively. In some embodiments, the gate driving circuit 181, the gate driving circuit 182, the signal control circuit 101 and the signal control circuit 102 of FIG. 13 may be arranged on the same side of the active region AA, such that each of the output control components 12 of the signal control circuit 101 and the corresponding one of the output control components 12 of the signal control circuit 102 may be coupled to the same end of the corresponding emission control line EML.

In the embodiment of FIG. 13, the signal control circuit 101 and the detecting circuit 201 of the electronic device 1*e* may be respectively the same as or similar to the signal control circuit 101 and the detecting circuit 201 shown in FIG. 6, and the electrical connecting structure of the first stage output unit O2[1] to the n-th stage output unit O2[n] with the output control components 12 and the electrical connecting structure of the detecting circuit 201 with the n-th stage output unit O2[n] and the control circuit 14 may be similar to the embodiment of FIG. 6, so they are not described in detail herein and may be referred to the above contents. In addition, the method in which the detecting circuit 201 detects the normal or abnormal n-th stage emission control signal EM[n] and the method in which the control circuit 14 of the signal control circuit 101 turns on or off the output control component 12 according to the enable signal Sen1 may be referred to the above contents. Similarly, since the signal control circuit 102 and the detecting circuit 202 may be the same or similar to the signal control circuit 101 and the detecting circuit 201 respectively, the operation methods of the signal control circuit 102 and the detecting circuit 202 may be respectively the same as the operation methods of the signal control circuit 101 and the detecting circuit 201 and are not described in detail herein.

In some embodiments, the electronic device 1*e* of FIG. 13 may optionally not include the signal control circuit 101 and/or the control circuit 14 of the signal control circuit 102. Alternatively, the electronic device 1*e* of FIG. 13 may optionally not include the detecting circuit 201 and/or the detecting circuit 202, but not limited thereto. In some embodiments, the gate driving circuit 181, the gate driving circuit 182, the signal control circuit 101 and the signal control circuit 102 of FIG. 13 may be disposed on the same side of the active region AA, as shown in FIG. 12. In some embodiments, the electronic device 1*e* of FIG. 13 may optionally not include the signal control circuit 101 and/or the control circuit 14 of the signal control circuit 102. Alternatively, the electronic device 1*e* of FIG. 13 may optionally not include the detecting circuit 201 and/or the detecting circuit 202.

In some embodiments, the gate driving circuit 181 of the electronic device 1*e* of FIG. 13 may further include the first stage output unit O1[1] to the n-th stage output unit O1[n] shown in FIG. 4, FIG. 6, FIG. 11 or FIG. 12 respectively used to output the first stage output signal to the n-th stage output signal to the scan lines SL, and in this case, the electronic device 1*e* may further include another signal control circuit 101 and/or another detecting circuit 201, wherein the another signal control circuit 101 and the another detecting circuit 201 may adopt the signal control circuit 101 and the detecting circuit 201 of the above-mentioned embodiment to avoid the abnormal first stage scan signal SN[1] to n-th stage scan signal SN[n] being transmitted to the electronic component, thereby reducing the impact on the operation of the electronic component. Similarly, the gate driving circuit 182 may further include the first stage output unit O1[1] to the n-th stage output unit O1[n] shown in FIG. 4, FIG. 6, FIG. 11 or FIG. 12, and the electronic device 1*e* may include another signal control circuit 102 and/or another detecting circuit 202, wherein the another signal control circuit 102 and the another detecting circuit 202 may adopt the signal control circuit 102 and the detecting circuit 202 of the above-mentioned embodiment, so they are not described in detail here.

In summary, in the electronic device of the present disclosure, the control circuit in the signal control circuit may turn on or off the output control components through the received enable signal, and/or the detecting circuit may provide the enable signal by determining if the n-th stage scan signal is normal to turn on or off the output control components. Accordingly, when at least one output unit of one of the gate driving circuits is abnormal, all the output control components corresponding to the abnormal gate driving circuit may be turned off to prevent the operation of the electronic component from being affected by the abnormal signal and causing abnormal effects, such as abnormal images displayed in the entire display region or overheating and burning out of the electronic device caused by short circuit. At this time, another gate driving circuit may provide the normal first to n-th stage scan signals and/or normal first to n-th stage emission control signals to the electronic component, so that the electronic component is still able to operate normally.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device having an active region and a non-active region, and the electronic device comprising:

an electronic component disposed in the active region;

a first gate driving circuit disposed in the non-active region and coupled to the electronic component;

at least one first output control component disposed in the non-active region, and the at least one first output control component comprising a control terminal, a first terminal and a second terminal; and a first control circuit disposed in the non-active region, wherein the control terminal of the at least one first output control component is coupled to the first control circuit, the first terminal of the at least one first output control component is coupled to the first gate driving circuit, and the second terminal of the at least one first output control component is coupled to the electronic component, wherein the first control circuit comprises a capacitor and a plurality of transistors, each of the plurality of transistors comprises a first terminal, a second terminal and a control terminal, and the plurality of transistors comprise a first transistor, a second transistor and a third transistor, wherein the first terminal of the first transistor and the first terminal of the second transistor are coupled to each other and used to receive an enable signal, and the second terminal of the first transistor and the second terminal of the second transistor are coupled to two terminals of the capacitor respectively, wherein the first terminal and the second terminal of the third transistor are coupled to the second terminal of the first transistor and ground respectively, and wherein the control terminal of the second transistor and the control terminal of the third transistor are used to receive a first clock signal, and the control terminal of the first transistor is used to receive a second clock signal.

2. The electronic device as claimed in claim 1, wherein each of the plurality of transistors and the at least one first output control component is a P-type transistor or an N-type transistor.

3. The electronic device as claimed in claim 1, wherein the at least one first output control component comprises a plurality of first output control components, each of the plurality of first output control components comprises the control terminal, the first terminal and the second terminal, and the control terminal of each of the plurality of first output control components is coupled to the first control circuit.

4. The electronic device as claimed in claim 3, wherein the first gate driving circuit comprises a first stage output unit to an n-th stage output unit used to output a first stage output signal to an n-th stage output signal respectively, the first stage output unit to the n-th stage output unit are coupled to the first terminals of the plurality of first output control components respectively, and n is a positive integer.

5. The electronic device as claimed in claim 1, further comprising a first detecting circuit disposed in the non-active region, wherein the first detecting circuit has an input terminal and an output terminal, the input terminal of the first detecting circuit is coupled to the first gate driving circuit, and the output terminal of the first detecting circuit is coupled to the first control circuit.

6. The electronic device as claimed in claim 1, wherein the electronic component comprises a pixel, and the pixel comprises a switching transistor, wherein a control terminal of the switching transistor is coupled to the second terminal of the at least first output control component.

7. The electronic device as claimed in claim 1, wherein the electronic component comprises a pixel, and the pixel comprises an emission control transistor and a light emitting component, wherein a control terminal of the emission control transistor is coupled to the second terminal of the at least one first output control component.

8. The electronic device as claimed in claim 1, further comprising a second gate driving circuit, at least one second output control component, and a second control circuit disposed in the non-active region, wherein the at least one second output control component comprises a control terminal, a first terminal and a second terminal, the control terminal of the at least one second output control component is coupled to the second control circuit, the first terminal of the at least one second output control component is coupled to the second gate driving circuit, and the second terminal of the at least one second output control component is coupled to the electronic component.

9. The electronic device as claimed in claim 8, further comprising a second detecting circuit disposed in the non-active region, wherein the second detecting circuit has an input terminal and an output terminal, the input terminal of the second detecting circuit is coupled to the second gate driving circuit, and the output terminal of the second detecting circuit is coupled to the second control circuit.

10. The electronic device as claimed in claim 8, wherein the first gate driving circuit and the second gate driving circuit are disposed on two opposite sides of the active region respectively.

11. The electronic device as claimed in claim 8, wherein the first gate driving circuit and the second gate driving circuit are disposed on a same side of the active region.

12. An electronic device having an active region and a non-active region, and the electronic device comprising:

an electronic component disposed in the active region;

a first gate driving circuit disposed in the non-active region and coupled to the electronic component;

a plurality of first output control components disposed in the non-active region, and each of the plurality of first output control components comprising a control terminal, a first terminal and a second terminal; and a first detecting circuit disposed in the non-active region, wherein the first detecting circuit has an input terminal and an output terminal, the input terminal of the first detecting circuit is coupled to the first gate driving circuit, and the output terminal of the first detecting circuit is coupled to the control terminal of each of the plurality of first output control components, the first terminals of the plurality of first output control components are coupled to the first gate driving circuit, the second terminals of the plurality of first output control components are coupled to the electronic component, and the first detecting circuit comprises five transistors, a capacitor, and two inverters.

13. The electronic device as claimed in claim 12, wherein each of the plurality of first output control components is a P-type transistor or an N-type transistor.

14. The electronic device as claimed in claim 12, wherein the electronic component comprises a pixel, and the pixel comprises a switching transistor, wherein a control terminal of the switching transistor is coupled to the second terminal of one of the plurality of first output control components.

15. The electronic device as claimed in claim 12, wherein the electronic component comprises a pixel, and the pixel comprises an emission control transistor and a light emitting component, wherein a control terminal of the emission control transistor is coupled to the second terminal of one of the plurality of first output control components.

16. The electronic device as claimed in claim 12, further comprising a second gate driving circuit, a plurality of second output control components, and a second detecting circuit disposed in the non-active region, wherein each of the plurality of second output control components comprises a control terminal, a first terminal and a second terminal, the second detecting circuit has an input terminal and an output terminal, the control terminals of the plurality of second output control components are coupled to the output terminal of the second detecting circuit, the input terminal of the second detecting circuit is coupled to the second gate driving circuit, and the second terminals of the plurality of second output control components are coupled to the electronic component.

17. The electronic device as claimed in claim 16, wherein the first gate driving circuit and the second gate driving circuit are disposed on two opposite sides of the active region, respectively.

18. The electronic device as claimed in claim 16, wherein the first gate driving circuit and the second gate driving circuit are disposed on a same side of the active region.

* * * * *